(12) United States Patent
Fukui et al.

(10) Patent No.: US 7,478,070 B2
(45) Date of Patent: Jan. 13, 2009

(54) ELECTRIC POWER SUPPLY CONTROL SYSTEM

(75) Inventors: Chihiro Fukui, Hitachinaka (JP);
Takaharu Ishida, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1744 days.

(21) Appl. No.: 09/793,518

(22) Filed: Feb. 27, 2001

(65) Prior Publication Data

US 2001/0025209 A1 Sep. 27, 2001

Related U.S. Application Data

(63) Continuation of application No. 09/296,668, filed on Apr. 22, 1999, now abandoned.

(30) Foreign Application Priority Data

Apr. 24, 1998 (JP) .......................... 10-114592

(51) Int. Cl.
G06F 17/60 (2006.01)

(52) U.S. Cl. ..................... 705/412; 700/28; 700/32; 700/36; 700/286

(58) Field of Classification Search .............. 700/28, 700/32, 36, 286, 291, 295, 297; 705/7, 8, 705/9, 10, 412
See application file for complete search history.

(56) References Cited

U.S. PATENT DOCUMENTS

| 4,075,699 | A | 2/1978 | Schneider et al. ........... 364/492 |
|---|---|---|---|
| 4,247,786 | A | 1/1981 | Hedges ........................ 307/35 |
| 5,274,571 | A | 12/1993 | Hesse et al. .................. 364/492 |
| 5,479,358 | A | 12/1995 | Shimoda et al. .............. 364/492 |
| 5,537,339 | A | 7/1996 | Naganuma et al. ........... 364/550 |
| 5,621,654 | A | 4/1997 | Cohen et al. ................. 364/493 |
| 2001/0025209 | A1 * | 9/2001 | Fukui et al. .................. 700/291 |

FOREIGN PATENT DOCUMENTS

| JP | 7-143670 | | 6/1995 |
|---|---|---|---|
| JP | 07-212972 | A * | 8/1995 |
| JP | 11-308771 | A * | 11/1999 |

OTHER PUBLICATIONS

Power System Security Control Calculations Using Linear Programming, Part I, Brian Stott and Eric Hobson; IEEE Transactions on Power Apparatus and Systems, vol. PAS–97, No. 5, Sep./Oct. 1978.

(Continued)

*Primary Examiner*—Edward Cosimano
(74) *Attorney, Agent, or Firm*—Kenyon & Kenyon LLP

(57) ABSTRACT

With regard to electric-power-supply control, there is provided an electric power supply control system for implementing load control used to be executed for each individual customer consuming electric power as coordinated control for all customers and for selecting an optimum electric-power supplier in case there are a plurality of electric-power suppliers supplying electric power to the customers. Disclosed is the electric power supply control system for purchasing electric power from a plurality of electric-power suppliers and distributing purchased electric power to any arbitrary number of customers, the system comprising: an electric-power-purchase determining apparatus for selecting some of the electric-power suppliers and determining amounts of electric power to be purchased from the selected electric-power suppliers in accordance with a predetermined rule; an electric-power storage apparatus for storing electric power; and a demand control apparatus for transmitting electric power obtained by synthesizing electric power determined by the electric-power-purchase determining apparatus with electric power generated or absorbed by the electric-power storage apparatus to the customers.

8 Claims, 28 Drawing Sheets

OTHER PUBLICATIONS

Power System Security Control Calculations Using Linear Programming, Part II, Brian Stott and Eric Hobson; IEEE Transactions on Power Apparatus and Systems, vol. PAS–97, No. 5, Sep./Oct. 1978.

Introduction to Multivariable Analyses Part I, by Noriaki Kawaguchi, published by Morikita Publishing Company 1973.

Electric Power System Engineering by Yasuji Sekine, Junichi Toyota, Muneaki Hayashi, Yasuo Serizawa and Jun Hasegawa, Published by Corona Corporation 1979.

Wiley Encyclopedia of Electrical and Electronics Engineering, vol. 17, John G. Webster, Editor, p. 58 "Measuring Power Quality Events".

* cited by examiner

F I G. 11
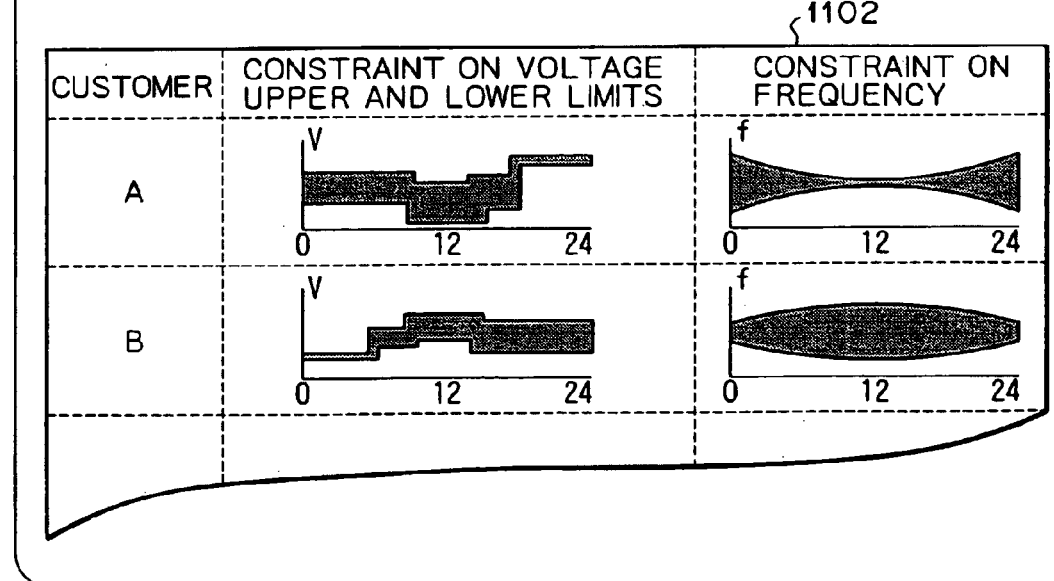

F I G. 13
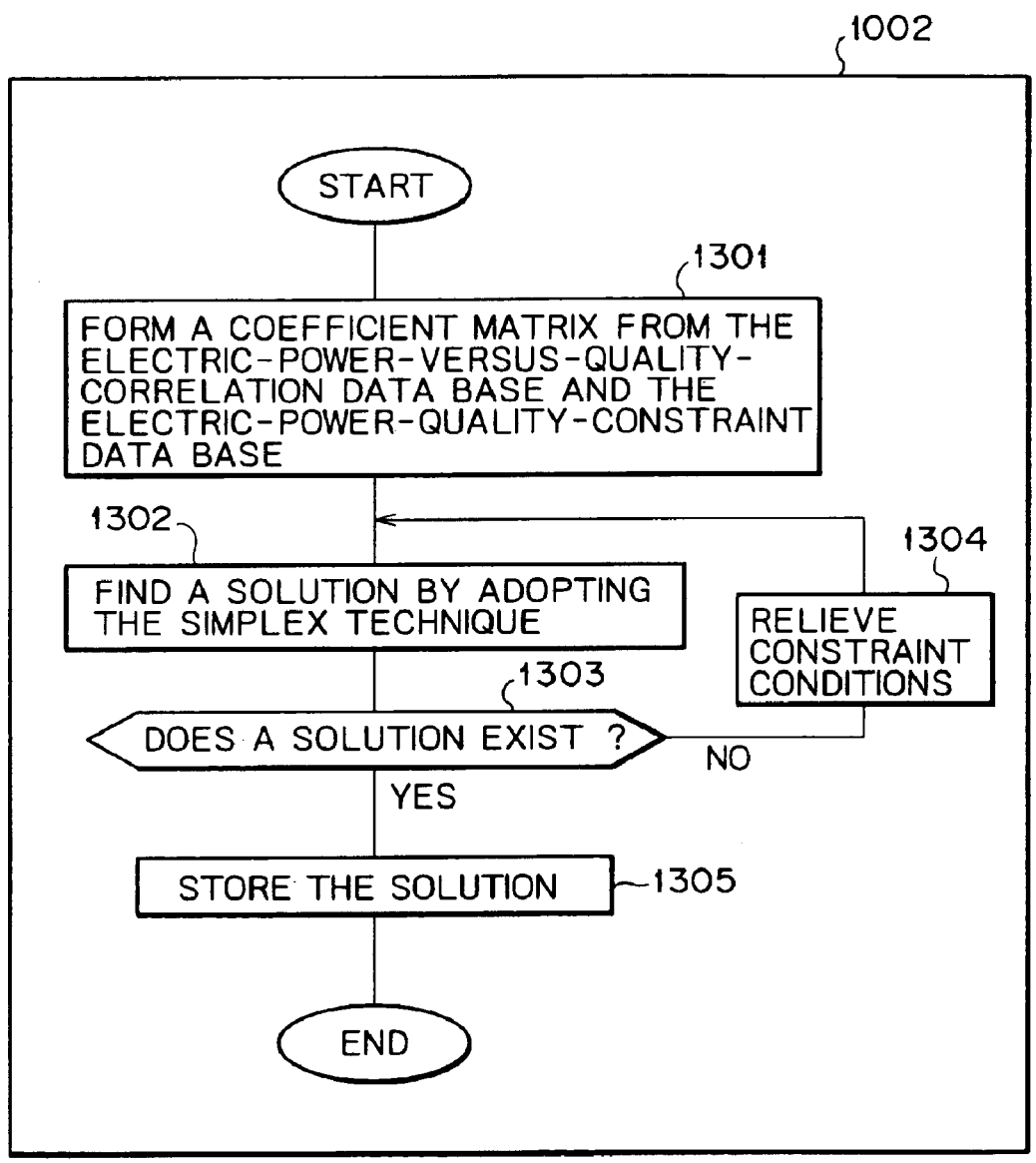

| FACILITY NAME | RESISTANCE | INDUCTANCE | CAPACITANCE | TAP RATIO |
|---|---|---|---|---|
| #1-#2 | | | | |
| #1-#5 | | | | |
| #2-#3 | | | | |
| #2-#4 | | | | |
| #2-#5 | | | | |
| #3-#4 | | | | |
| #4-#5 | | | | |
| #4-#7 | | | | |

1602

| FACILITY NAME | GENERATOR ACTIVE POWER | GENERATOR REACTIVE POWER | ACTIVE-POWER LOAD | REACTIVE-POWER LOAD | VOLTAGE |
|---|---|---|---|---|---|
| #1 | | | | | |
| #2 | | | | | |
| #3 | | | | | |
| #4 | | | | | |
| #5 | | | | | |
| #6 | | | | | |
| #7 | | | | | |
| #8 | | | | | |

F I G . 2 0

| TIME | WEATHER CONDITION | ATMOSPHERIC TEMPERATURE (°C) | HUMIDITY (%) | AMOUNT OF INSOLATION (LX) | WIND VELOCITY (M) |
|---|---|---|---|---|---|
| 10:00 | CLOUDY | | | | |
| 10:05 | | | | | |
| 10:10 | | | | | |
| 10:15 | | | | | |
| 10:20 | | | | | |
| .... | | | | | |

2001

ELECTRIC POWER SUPPLY CONTROL SYSTEM

This is a continuation of U.S. Ser. No. 09/296,668, filed Apr. 22, 1999, now abandoned.

BACKGROUND OF THE INVENTION

In general, the present invention relates to a control system for controlling an electric-power system. More particularly, the present invention relates to an electric power supply control system for purchasing electric power from a plurality of electric-power suppliers and supplying an optimum amount of electric power to each of a plurality of customers.

As a conventional technology used for controlling an electric-power system and supplying electric power to the customer, a demand limiting apparatus is disclosed in JP-A 7-143670. The demand limiting apparatus limits consumption of electric power when the amount of electric power consumed by an electric-power load, which is connected to an electric-power system and includes an air conditioner, is about to exceed the contracted amount of electric power. With this conventional technology, the operation of the air conditioner is adjusted in accordance with a magnitude by which the electric-power consumption would exceed the contracted amount to implement load control allowing no comfort to be lost.

SUMMARY OF THE INVENTION

In the conventional technology described above, the load control is implemented by considering only a customer on the demand side to the bitter end, and the air conditioner is the only control object to achieve a comfort goal.

On the other hand, the so-called load leveling control is executed by suppressing an electric-power load in order to achieve a regulated demand for electric power. From the load-leveling point of view, by executing coordinated control of a plurality of customers demanding electric power rather than control of customers individually, load control optimum for all can be executed. For example, if the amount of required electric power can be adjusted internally among customers consuming the power, the amount of electrical energy purchased collectively by the customers can be reduced. However, such coordinated control can not be implemented by using the conventional technology.

When viewed from the standpoint of the customer consuming electric power, the conventional technology is established on the assumption that electric power is supplied by one particular electric-power supplier. The conventional technology does not include selection of an electric-power supplier from which electric power is to be purchased in case a plurality of electric-power suppliers exist In this respect, there is a problem of difficulty to construct a system that allows individual customers demanding electric power to select an electric-power supplier independently. It should be noted that, in this specification, an electric-power supplier means an enterprise doing a business of selling electric power such as an electric-power generating company, an electric-power transmitting company or an electric-power distributing company. In addition, an electric-power supplier also implies an enterprise that does businesses of storing electric power in an electric-power storage apparatus to be sold to consumers.

It is thus an object of the present invention to provide an electric power supply control system for implementing load control used to be executed for each individual customer consuming electric power as coordinated control for all customers and for selecting an optimum electric-power supplier in case there are a plurality of electric-power suppliers supplying electric power to the customers.

In order to achieve the object described above, the present invention provides an electric power supply control system for purchasing electric power from a plurality of electric-power suppliers and for distributing the purchased electric power to any arbitrary number of customers demanding electric power. The electric power control system comprises:

an electric-power-purchase determining apparatus for selecting an electric-power supplier as an electric-power seller from a plurality of electric-power suppliers in accordance with a predetermined rule and determining an amount of electric power to be purchased from the selected supplier;

an electric-power storage apparatus for storing electric power; and a demand control apparatus for distributing electric power to each customer consuming electric power by adding electric power generated by the electric-power storage apparatus to electric power of the amount determined by the electric-power-purchase determining apparatus or by subtracting electric power to be absorbed by the electric-power storage apparatus from electric power of the amount determined by the electric-power-purchase determining apparatus.

It should be noted that the electric power supply control system provided by the present invention is referred to as a community power pool in embodiments described hereafter.

BRIEF DESCRIPTION OF THE DRAWINGS

FIG. 11 is a table showing typical voltage sustaining rates, transmitted electric-power sensitivity coefficients and electric-power quality constraints;

FIG. 13 is a flowchart representing an embodiment implementing a customer-classified-electric-power-transmission-amount determining sub-unit;

FIG. 16 is a diagram showing typical data stored in a data base used in the facility-control executing apparatus;

FIG. 20 is a diagram showing a typical weather-information data base;

DETAILED DESCRIPTION OF THE INVENTION

A first embodiment of the present invention is described as follows.

Figure 1:
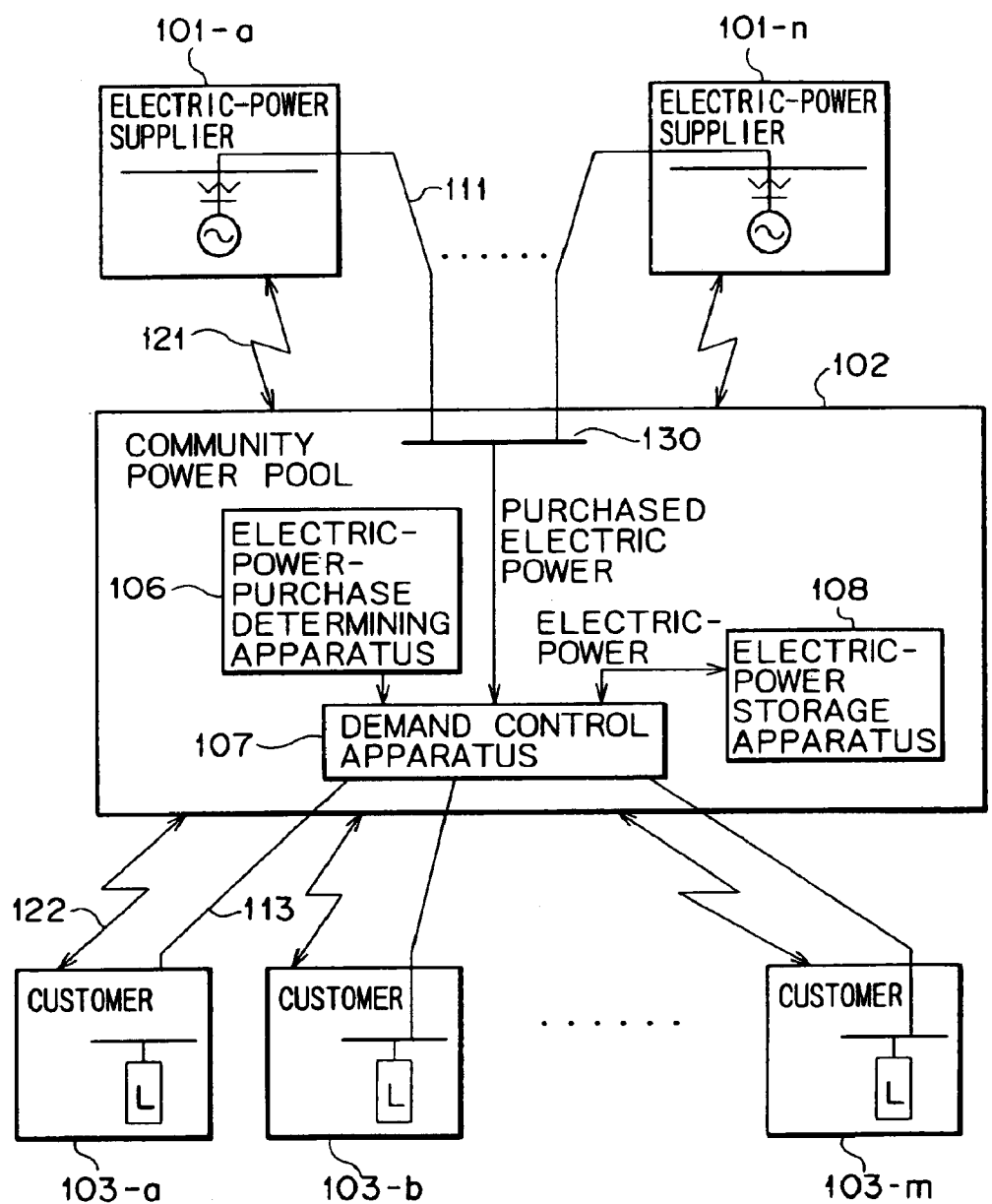
FIG. 1 is a diagram showing a typical configuration of a community power pool provided by the present invention.

FIG. 1 is a diagram showing a typical configuration of a community power pool 102 provided by the present invention in a simple and plain manner, As shown in the figure, positioned between any arbitrary number of electric-power suppliers 101-$a$ to 101-$n$ and any arbitrary number of customers 103-$a$ to 103-$m$, the community power pool 102 purchases electric power by using an electric-power-transmission facility 111 and supplies the electric power to the customers 103-$a$ to 103-$m$ by using an electric-power-distribution facility 113. The community power pool 102 has an electric-power-purchase determining apparatus 106 for determining how much power is to be purchased from each of the electric-power suppliers 101-$a$ to 101-$n$ and a demand control apparatus 107 for determining how the purchased electric power is to be distributed to the customers 103-$a$ to 103-$m$ and for determining which customers 103-$a$ to 103-$m$ the purchased electric power is to be distributed to. A communication facility 121 between each electric-power supplier 101 and the community power pool 102 is used for transmitting an amount of electric power to be purchased from an electric-power supplier 101 from a control apparatus of the community power pool 102 to the electric-power supplier 101, transmitting a price of electric power sold by an electric-power supplier 101 from the electric-power supplier 101 to the community power pool 102 and exchanging information on intentions to purchase or sell electric power between the community power pool 102 and an electric-power supplier 101. Thus, the electric-power suppliers 101-$a$ to 101-$n$ and the community power pool 102 each have a communication apparatus which is not shown in the figure. It should be noted that, in addition the communication facility 121 for transmitting an amount of electric power to be purchased from a control apparatus of the community power pool 102 to an electric-power supplier 101, transmitting a price of electric power sold by an electric-power supplier 101 from the electric-power supplier 101 to the community power pool 102 and exchanging information on intentions to purchase or sell electric power between the community power pool 102 and an electric-power supplier 101 as described above, a communication facility 122 is provided between the community power pool 102 and each customer 103, being used for transmitting the amount of electric power consumed during a fixed period of time by each facility installed in a customer 103 from the customer 103 to the community power pool 102, transmitting a price of an electric power unit for the next several hours from the control apparatus of the community power pool 102 to each customer 103 and transmitting a guidance as to how a customer should consume electrical energy in order to further lower the present electric-power rate from the community power pool 102 to each customer 103.

An amount of electric power to be purchased from each electric-power supplier 101 is determined by the electric-power-purchase determining apparatus 106 in accordance with a contract made between the community power pool 102 and each customer 103. While there are a variety of objective functions that can be used by the electric-power-purchase determining apparatus 106 to determine an amount of electric power to be purchased from each electric-power supplier 101, this embodiment is exemplified by an objective function to minimize the electric-power rate.

An amount of electric power to be purchased from each electric-power supplier 101 is determined by the electric-power-purchase determining apparatus 106 in accordance with a contract made between the community power pool 102 and each customer 103. To put it in detail, once the total amount of electric power to be purchased from all electric-power suppliers 101-$a$ to 101-$n$ is determined, an amount of electric power to be purchased from each electric-power supplier 101 is determined from a variety of menus showing electric-power rates presented by the electric-power suppliers 101-$a$ to 101-$n$ so as to minimize the objective function. A representative example of the objective function is minimization of the electric-power rate.

The electric-power storage apparatus 109 is capable of absorbing and generating active power or reactive power or both. The amount of electric power transmitted to the customers 103-$a$ to 103-$m$ is equal to the sum of the amount of electric power generated by the electric-power storage apparatus 108 and the total amount of purchased electric power or the difference between the amount of electric power absorbed by the electric-power storage apparatus 108 and the total amount of purchased electric power.

Purchased electric power is distributed to the customers 103-$a$ to 103-$m$ by way of the demand control apparatus 107. The electric power is distributed in an optimum manner by setting an objective function in advance. There are a variety of distribution objective functions, from a simple function of simply avoiding an excessively large current to a method of reducing the electric-power rate. In the latter method, an index of quality is defined for distributed electric power and the electric-power rate is reduced as much as possible even at the expense of the quality as long as no contract is violated.

There are a variety of methods to implement the demand control apparatus 107, from control to turn on and off loads individually as is used in the ordinary demand-side management to a method of providing an electric-power storage apparatus 108 parallel to the customers 103-*a* to 103-*m*. The electric-power storage apparatus 108 is capable of absorbing and generating active power or reactive power or both. As an apparatus for absorbing and generating reactive power only, the electric-power storage apparatus 108 operates like a phase modifier capable of controlling a voltage supplied to an customer 103. As an apparatus for absorbing and generating also active power, on the other hand, the electric-power storage apparatus 108 operates like a phase modifying apparatus for a system in which the amount of purchased electric power is excessive or insufficient. The electric-power storage apparatus 108 further operates as an emergency power supply in the event of an instantaneous power interruption. In addition, by adding an active-filter function for suppressing harmonics, the electric-power storage apparatus 108 becomes capable of operating as an electric-power-quality improving apparatus.

Figure 2:
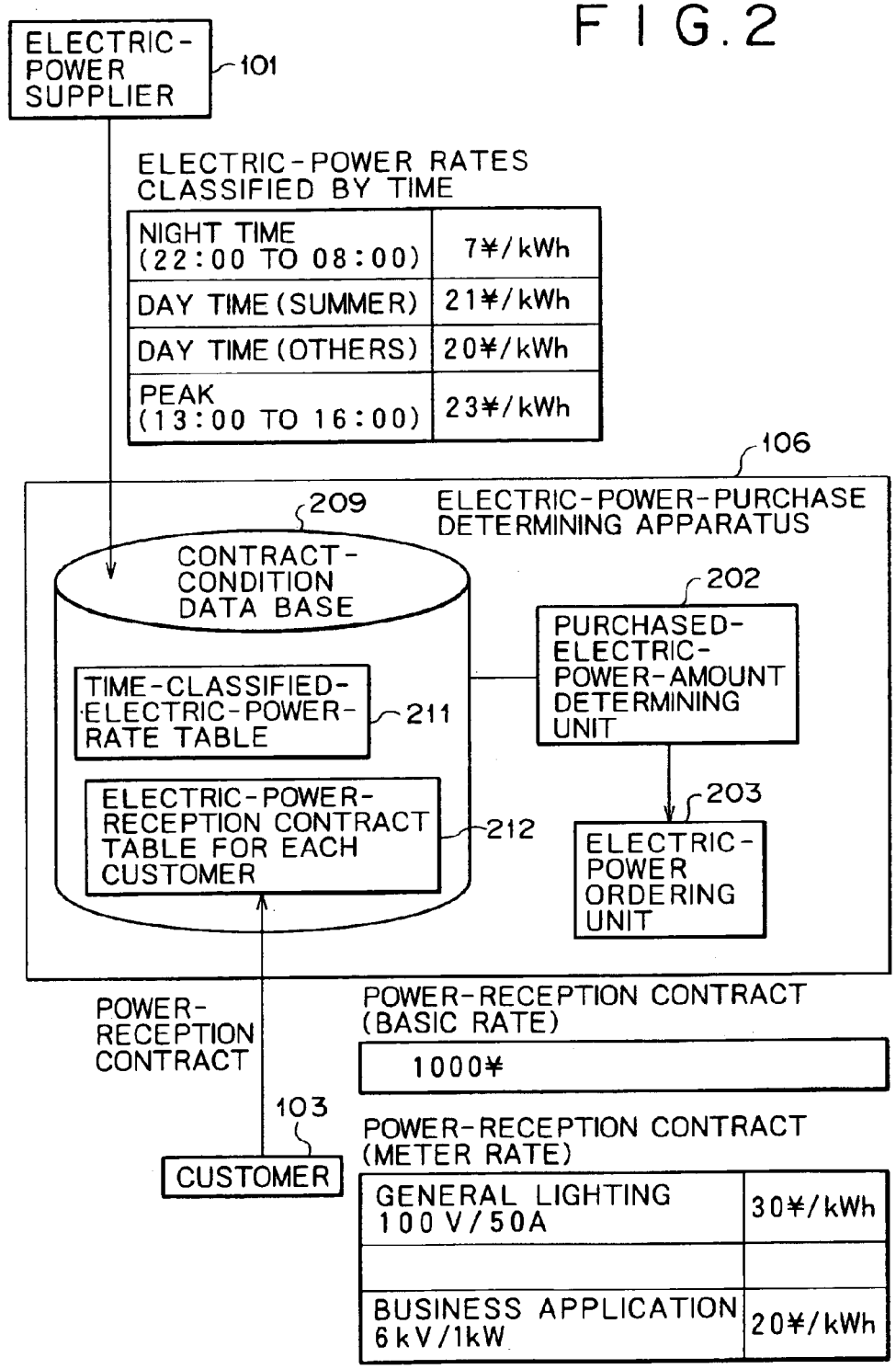
FIG. 2 is a diagram showing a typical configuration of a community power pool taking an electric-power rate into consideration.

FIG. 2 is a diagram showing the configuration of the electric-power-purchase determining apparatus 106. As shown in the figure, the electric-power-purchase determining apparatus 106 comprises a contract-condition data base 209, a purchased-electric-power-amount determining unit 202 and an electric-power ordering unit 203. The contract-condition data base 209 includes a table 211 of electric-power rates classified by time provided by the electric-power suppliers 101-*a* to 101-*n* and an electric-power-reception contract table 212 for the customers 103-*a* to 103-*m*. The purchased-electric-power-amount determining unit 202 determines the amount of electric power to be purchased on the basis of contracts made with the customers 103-*a* to 103-*m*. An electric-power-reception contract adopted in this embodiment is a contract specifying the amount of electric power to be supplied to an customer 103 in terms of amperes or kilowatts. A maximum demand for electric power is then computed form the contract amounts for the customers 103-*a* to 103-*m*. Then, the maximum demand is used for determining the amount of electric power to be purchased from each electric-power supplier 101 by referring to the time-classified-electric-power-rate table 211 showing power rates classified by time provided by the electric-power suppliers 101-*a* to 101-*n* in order to minimize the electric-power charge. Electric power of the determined amount is then ordered from the respective electric-power supplier 101 through the electric-power ordering unit 203. As described above, the embodiment is exemplified by simple time-classified-electric-power-rate accuracy and an ampere-based contract. It should be noted that there are a variety of types of contract contents.

Figure 3:
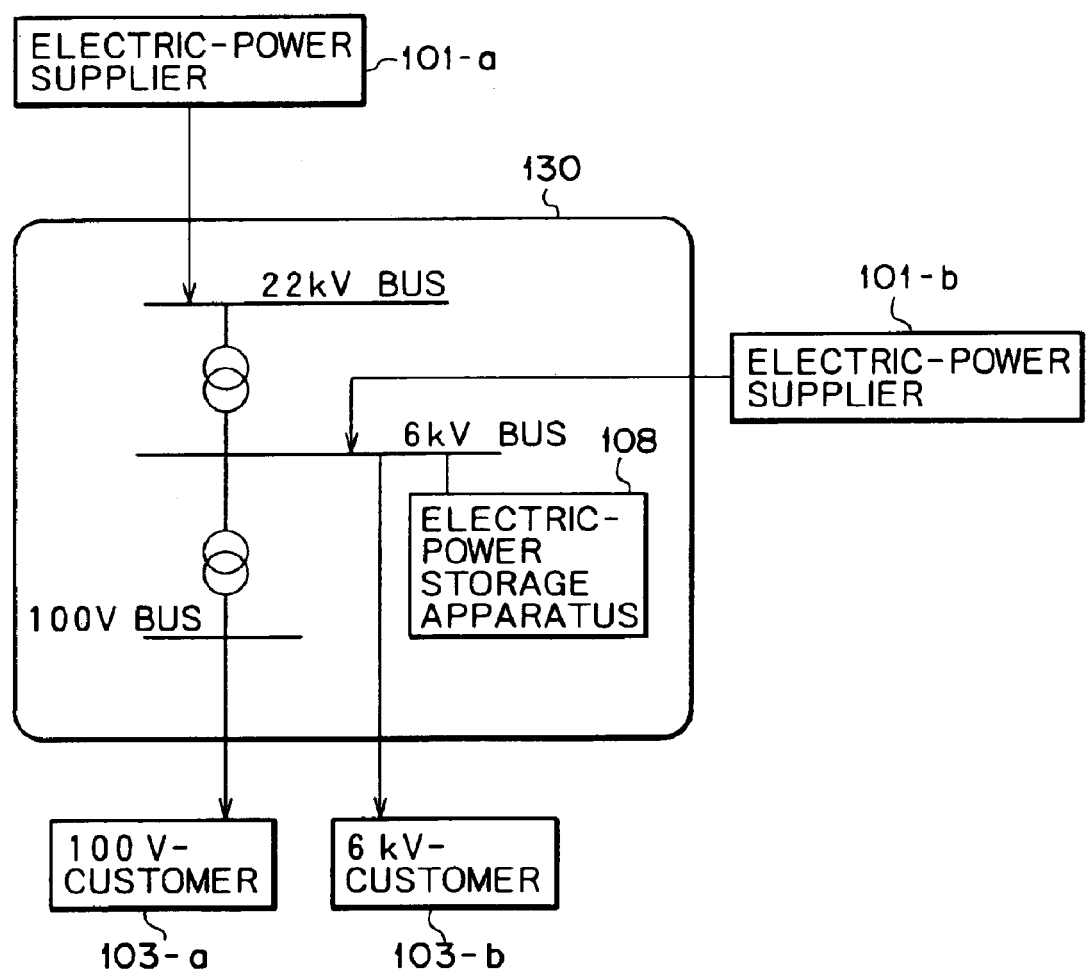
FIG. 3 is a conceptual diagram showing a community power pool at a substation.

In an customer 103, electric power may be received at a general electric-lighting rate at a voltage of 100V or 200V as is the case with an ordinary customer, or received as electric power for business purposes at a voltage of 6 kV. The community power pool 102 may change the voltage of electric power received from an electric-power supplier 101 if necessary by using a transformer installed therein. FIG. 3 is a conceptual diagram showing a community power pool 102 employing a first transformer for changing the voltage of electric power received from an electric-power supplier 101 typically from 22 kV to 6 kV when necessary and a second transformer to change the voltage from 6 kV to typically 100 V according to the need of an customer 103. It should be noted that the voltage levels shown in FIG. 3 are each a typical value to the bitter end. If electric power is supplied to the customers 103-*a* to 103-*m* at a uniform voltage, it is needless to say that the voltage transforming facility implemented by the second transformer is not required.

Electric power purchased from the electric-power suppliers 101-*a* to 101-*n* is distributed to the customers 103-*a* to 103-*m* through electric-power-reception buses 130 employed in the community power pool 102. The demand control apparatus 107 controls electric power distributed to the customers 103-*a* to 103-*m*. A means and a technique of distributing electric power will be described later.

Figure 4:
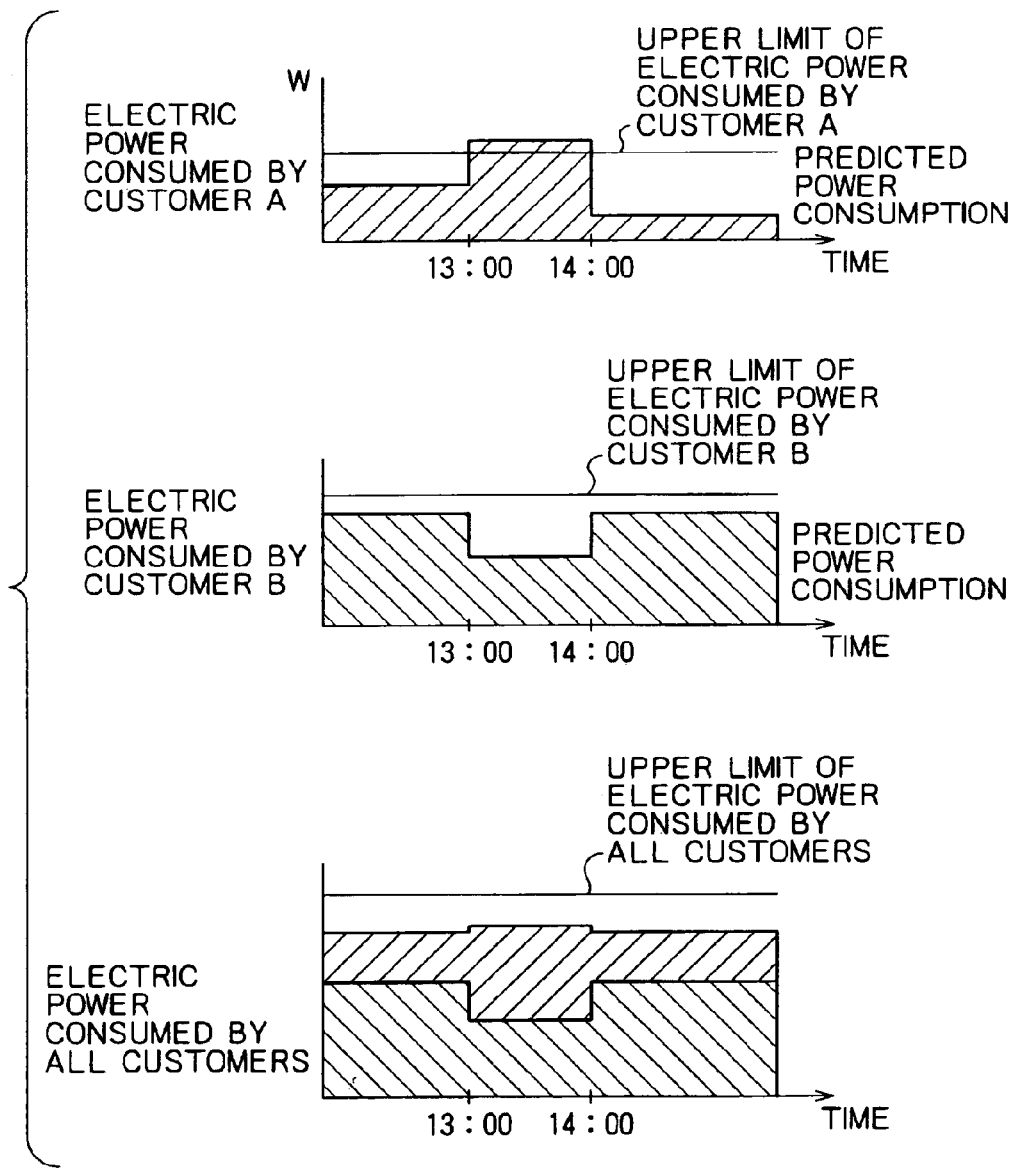
FIG. 4 is a diagram showing typical electric-power demand patterns of customers consuming electric power.

FIG. 4 is a diagram showing typical electric-power demand patterns of customers consuming electric power based on an objective function of optimizing distribution of electric power wherein an upper limit of electric-power consumption of a customer is violated.

To be more specific, FIG. 4 shows variations in predicted electric-power consumption of each customer 103 with the lapse of time. In the example shown in the figure, the electric-power consumption of customer A is predicted to exceed an upper limit of the electric-power consumption set for customer A over a period of time between 13:00 to 14:00 but the amount of electric power consumed by all the customers 103-*a* to 103-*m* does not exceed an upper limit of the total electric-power consumption. If only the customer A is taken into consideration, it is necessary for the demand control apparatus 107 to reduce the amount of electric power supplied to the customer A over a period of time between 13:00 to 14:00. From the standpoint of electric power consumed by all the customers 103-*a* to 103-*m*, on the other hand, it is not necessary to control amounts of electric power supplied to the customers 103-*a* to 103-*m* individually. Thus, if prevention of the amount of electric power consumed by all the customers 103-*a* to 103-*m* from exceeding the upper limit of the total electric-power consumption is taken as an objective function, the need to control amounts of electric power supplied to the customers 103-*a* to 103-*m* individually does not arise. If the amount of electric power consumed by all the customers 103-*a* to 103-*m* exceeds the upper limit of the total electric-power consumption, however, the amount of electric power distributed to each customer 103 needs to be reduced based on a power-reception contract for each customer. In this case, the amounts of electric power supplied to the customers 103-*a* to 103-*m* can be reduced equally or, transmission of electric power to the customers 103-*a* to 103-*m* can be temporarily halted sequentially customer after customer on a time-division basis.

Figure 5:
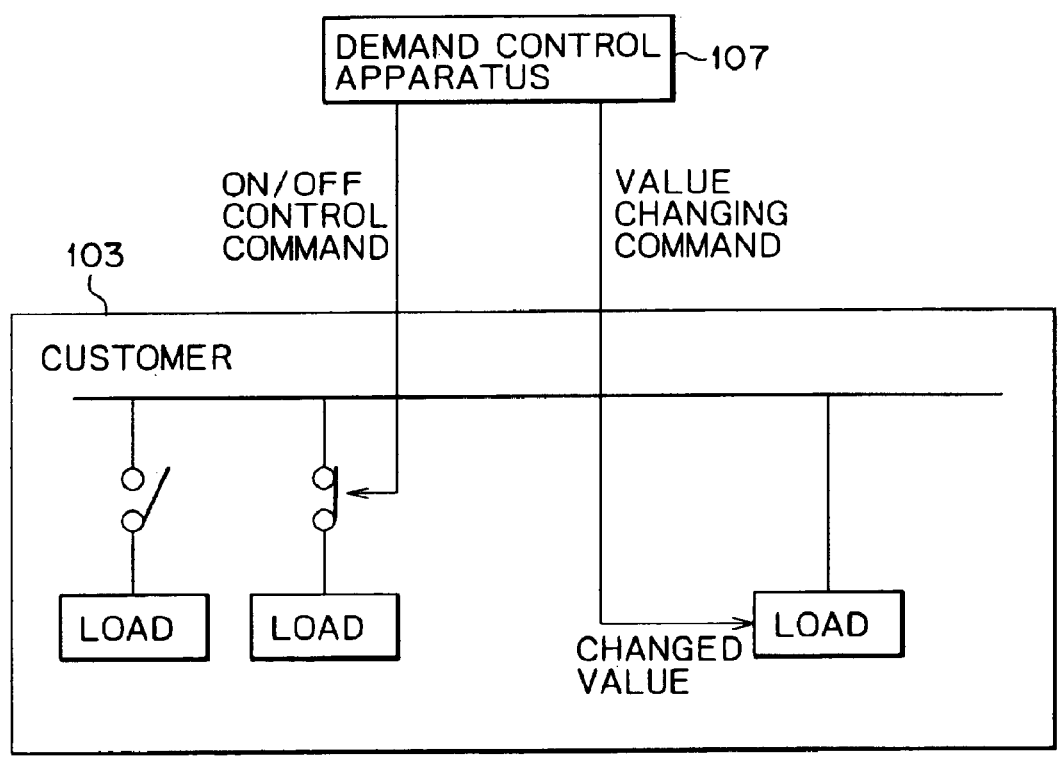
FIG. 5 is a conceptual diagram showing how a demand control apparatus executes load control.

FIG. 5 is a conceptual diagram showing how the demand control apparatus 107 executes load control. The example shown in this figure adopts 2 methods of reducing the amounts of electric power supplied to the customers 103-*a* to 103-*m* individually. According to the first method, loads of individual customers 103-*a* to 103-*m* are connected and disconnected. In the second method, on the other hand, a command to change the magnitude of an individual load is issued. For example, a command issued in accordance with the second method changes a set temperature for an air conditioner or a value for a power-consumption target.

Figure 6:
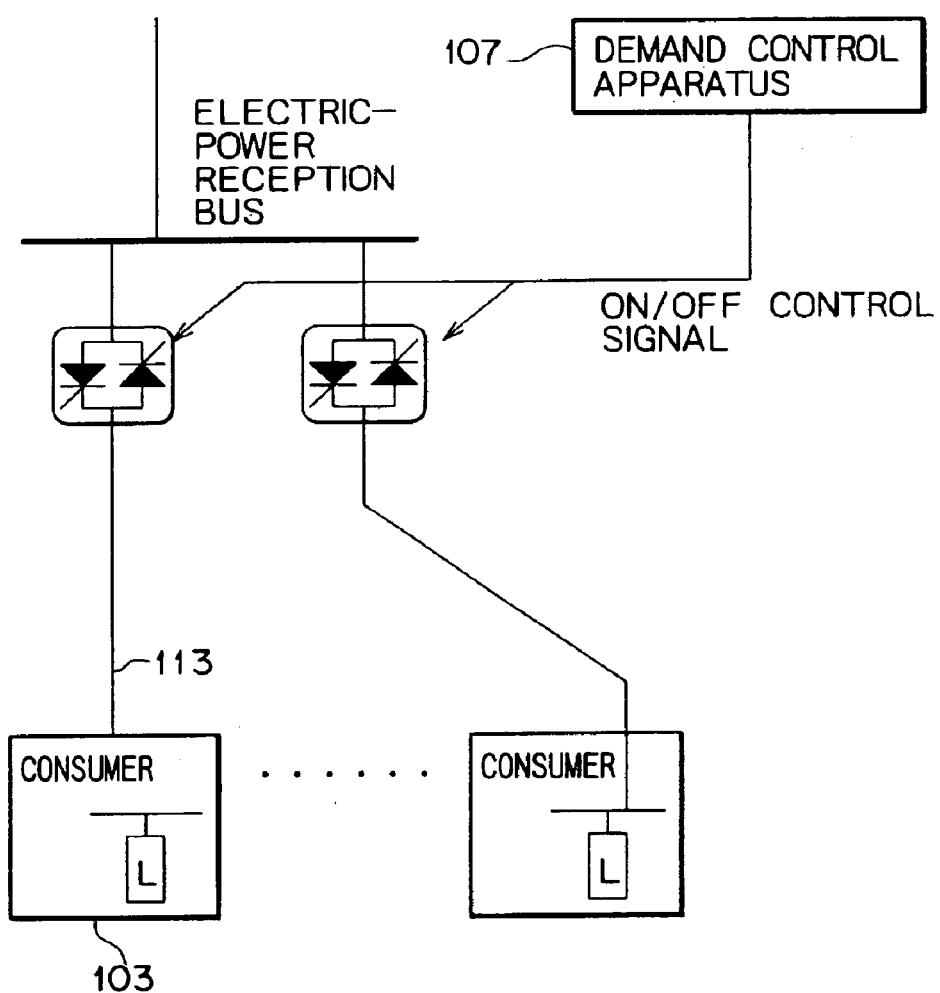
FIG. 6 is a conceptual diagram showing how a demand control apparatus controls devices each connected in series to a customer.

FIG. 6 is a conceptual diagram showing another way to implement the demand control apparatus 107. In the example shown in the figure, a semiconductor switch is inserted in series between the electric-power-reception bus 130 of the community power pool 102 and each customer 103. In this example, the semiconductor switch is implemented by 2 thyristors connected to each other in opposite directions to form a parallel circuit. With such a switch, transmission of electric power to an customer 103 can be turned on and off for each half cycle. It should be noted, however, that implementations of the series switch are not limited to this parallel circuit of thyristors. For example, the switch can be implemented by an AC-DC-AC-conversion circuit employing inverters, so that the amount of electric power supplied to an customer 103 can be changed without halting the supplying of electric power to the customer 103.

Figure 7:
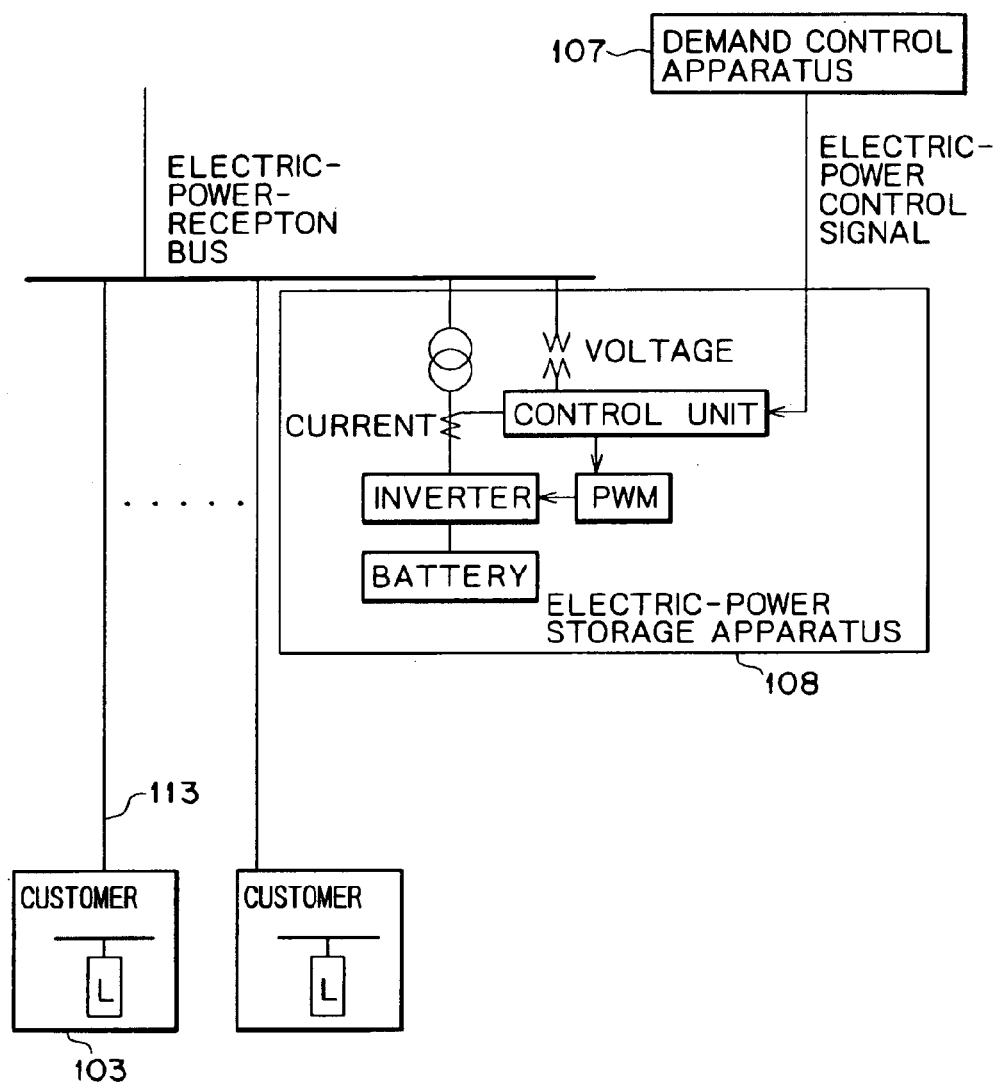
FIG. 7 is a conceptual diagram showing how a demand control apparatus controls equipment connected in parallel to customers.

FIG. 7 is a conceptual diagram showing another way to implement the demand control apparatus controls 107. In the example shown in the figure, the electric-power storage apparatus 108 is connected to the electric-power-reception bus 130 of the community power pool 102 in parallel to the customers 103-*a* to 103-*m*. The electric-power storage apparatus 108 is capable of absorbing and generating active power or reactive power or both. In this example, inverter control allows electric power to be absorbed and generated with a high degree of freedom. In a configuration employing inverters, active power and reactive power can be controlled independently of each other. As an apparatus for absorbing and generating reactive power only, the electric-power storage apparatus 108 operates like a phase modifier such as an SVC capable of controlling a voltage supplied to an customer 103. As an apparatus for absorbing and generating also active power, on the other hand, the electric-power storage apparatus 108 operates like a phase modifying apparatus for a system in which the amount of purchased electric power is excessive or insufficient. The electric-power storage apparatus 108 further operates as an emergency power supply in the event of an instantaneous power interruption. In addition, by adding an active-filter function for suppressing harmonics, the electric-power storage apparatus 108 becomes capable of operating as an electric-power-quality improving apparatus.

According to this embodiment, electric power required by the customers 103-*a* to 103-*n* is purchased in a collective manner and distributed to the customers 103-*a* to 103-*m* by internal adjustment of among amounts of power consumed by the customers 103-*a* to 103-*m*. As a result, the total amount of electrical energy can be reduced and the total electric-power charge can thus be decreased as well. In addition, even if the electric-power consumption of a customer 103 exceeds an upper limit of the electric-power consumption set for the customer 103, load control is not executed to result in an effect of no suspension of the supplying of electric power as long as the amount of electric power consumed by all the customers 103-*a* to 103-*m* does not exceed an upper limit of the total electric-power consumption. In addition, since the demand control apparatus 107 operates in conjunction with the electric-power storage apparatus 108 which operates as an emergency power supply in the event of an excessive or insufficient amount of purchased power electric or in the event of an instantaneous power interruption, the reliability of the supplying of electric power can be increased. Moreover, by adding an active-filter function for suppressing harmonics, the electric-power storage apparatus 108 becomes capable of operating as an electric-power-quality improving apparatus.

Figure 8:
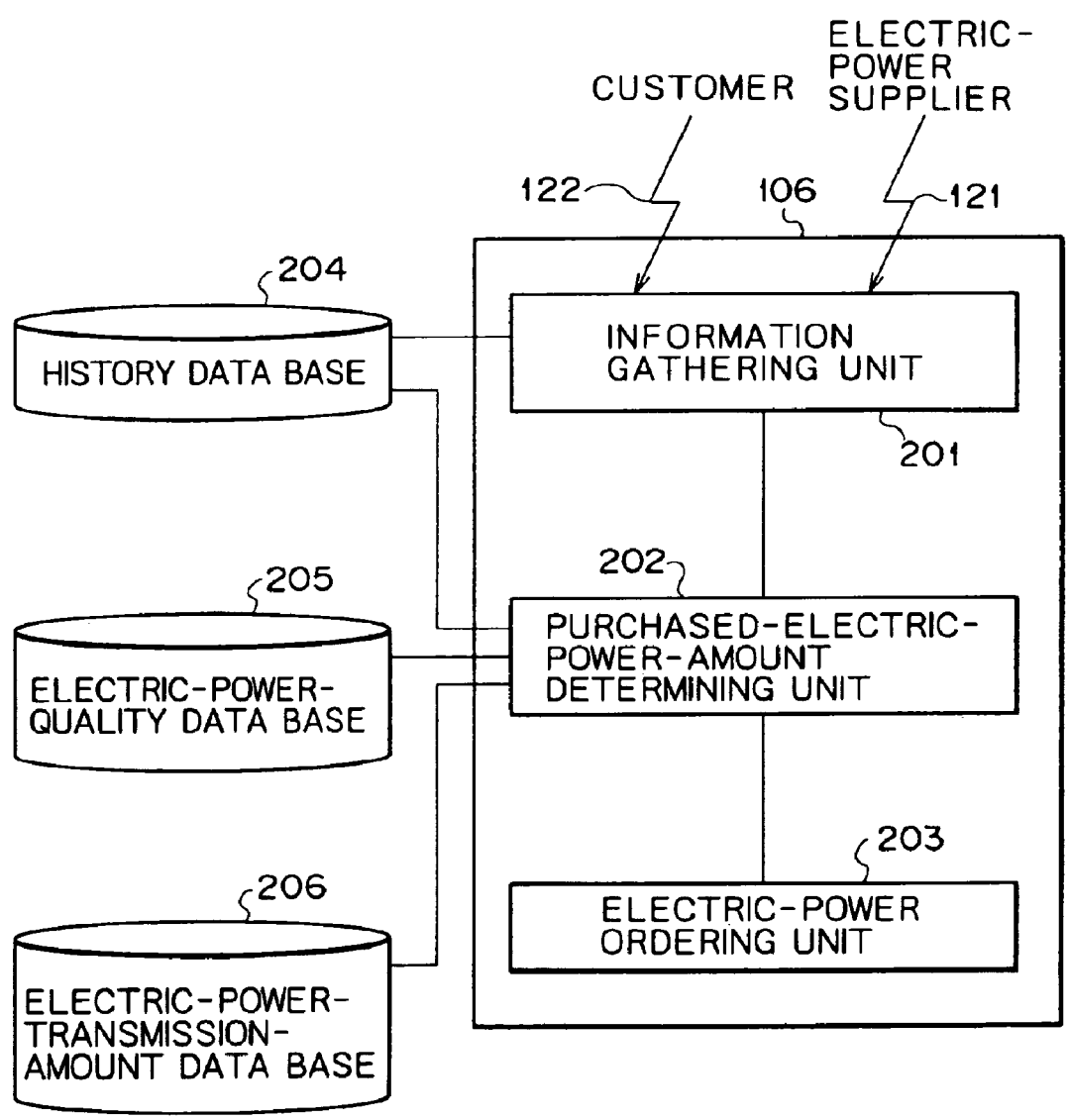
FIG. 8 is a diagram showing an embodiment implementing a purchased-electric-power-amount determining unit.

Next, details of the electric-power-purchase determining apparatus 106 are explained by referring to FIG. 8. As shown in the figure, the electric-power-purchase determining apparatus 106 comprises an information gathering unit 201, a purchased-electric-power-amount determining unit 202 and an electric-power ordering unit 203. The information gathering unit 201 collects information on the amount of electric power consumed by each facility installed in each customer 103 such as an air conditioner through a communication facility 122 and information provided by the electric-power suppliers 101-*a* to 101-*n* such as an amount of electric power that can be supplied by the electric-power suppliers 101-*a* to 101-*n*, prices of electric power and electric-power supplying times through a communication facility 121. The purchased-electric-power-amount determining unit 202 changes qualities of electric power for an customer 103 such as the frequency, the voltage and the harmonic generation rate of the power supply, and changes the amount of electric-power consumption of each customer 103 on the basis of information stored in a history data base 204, information on the present amount of required electric power collected by the information gathering unit 201 and information stored in an electric-power-quality data base 205 in order to determine an optimum amount of electric power to be actually purchased from each electric-power supplier 101. The history data base 204 is used for storing information gathered by the information gathering unit 201 including information on amounts of demanded electric power. On the other hand, the electric-power-quality data base 205 is used for storing contract conditions regarding qualities of electric power for each customer 103. The electric-power ordering unit 203 places order to purchase electric power from each electric-power supplier 101 on the basis of information stored in an electric-power-transmission-amount data base 206 and the amount of purchased electric power determined by the purchased-electric-power determining unit 202. The electric-power-transmission-amount data base 206 is used for storing the amount of electric-power consumption of each customer 103 after being changed by the purchased-electric-power determining unit 202.

Figure 9:
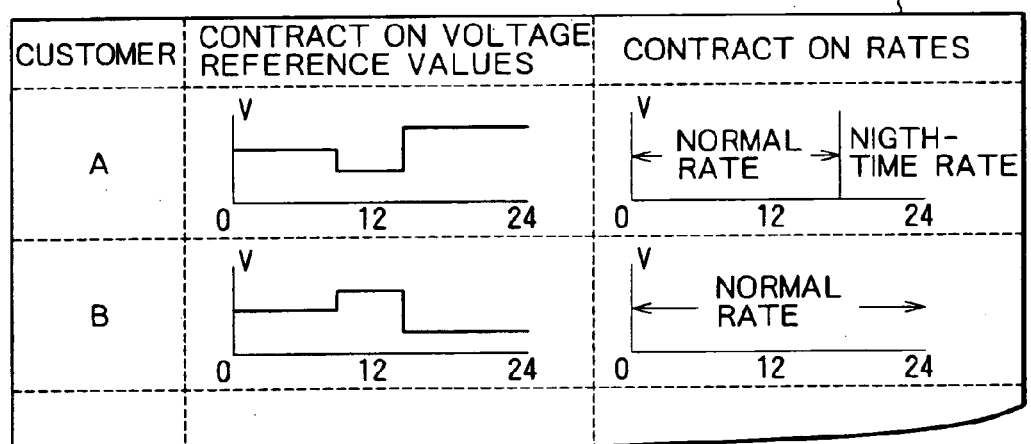
FIG. 9 is a diagram showing structures of data stored in a variety of data bases.

Next, pieces of typical data stored in the data bases 204, 205 and 206 shown in FIG. 8 are explained by referring to FIG. 9. Reference numerals 901 to 903 each denote typical data stored in the history data base 204. The data includes information on the amounts of electric power consumed at different times by electric-power consuming facilities installed in an customer 103 such as an air conditioner and a lamp. To be more specific, reference numeral 901 denotes history information for an customer A whereas reference numeral 902 and 903 denote history information for customers B and C respectively. Each history information includes a total amount of electric power consumed by the customer. Data with a format denoted by reference numeral 901 is stored for a fixed period of time.

Reference numeral 904 denotes typical data stored in the electric-power-quality data base 205. The data includes typical contents of a contract regarding voltage reference values for reducing electric-power consumption and typical contents of a contract regarding electric-power rates for each customer. For instance, in the example of an customer A which relatively consumes much electric power during the day time, the customer A makes a contract wherein the voltage is lowered to a certain degree in order to lower the electric-power charge even at the expense of the electric-power quality and a night-time contract at a low electric-power rate due to the fact that electrical energy is consumed more during the night than during the day time. In the example for an customer B which consumes much electric power during the day time, the customer B makes a contract to receive electric power with a high quality during the day time at an electric-power rate fixed for the whole day in order to secure electric power having a high quality all the time.

Reference numeral 905 denotes typical data stored in the electric-power-transmission-amount data base 206. The data represents an amount of electric power to be transmitted as determined by the purchased-electric-power-amount determining unit 202 in terms of a start transmission time, an end transmission time and an amount of electric-power consumption for each customer 103.

Next, each unit shown in FIG. 8 is explained in detail. As described above, the information gathering unit 201 gathers information including the prices of generated electric power and amounts of electric power that can be generated from a plurality of electric-power suppliers 101-*a* to 101-*n* through a communication facility 121 and information including operating states of electric-power consuming facilities and amounts of electric-power consumption from a plurality of customers 103-*a* to 103-*m* through the communication facility 122. These pieces of information are stored in the history data base 204.

Figure 10:
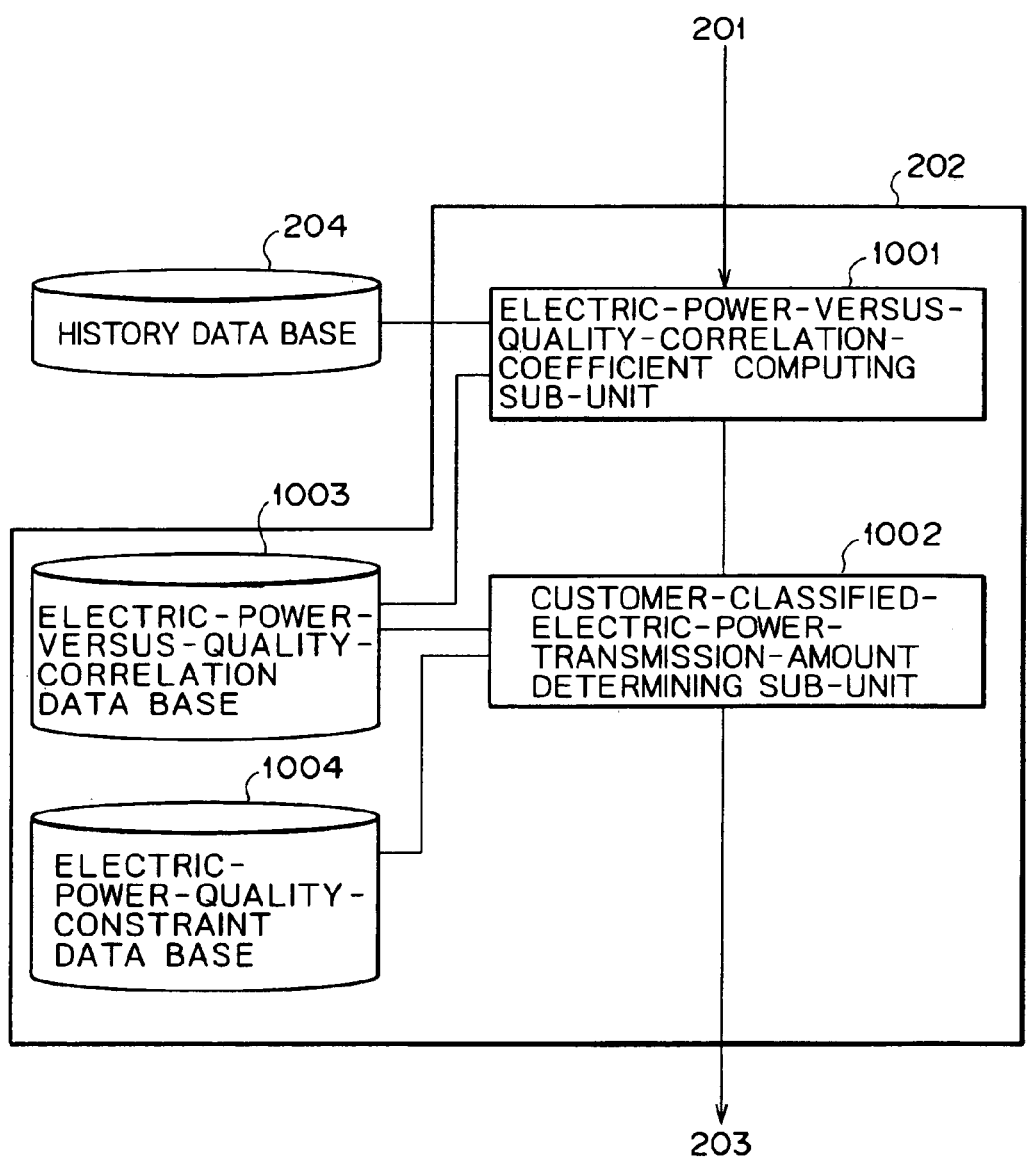
FIG. 10 is a diagram showing an embodiment implementing a purchased-electric-power-amount determining unit.

Next, details of the purchased-electric-power-amount determining unit 202 are explained by referring to FIG. 10. As shown in the figure, the purchased-electric-power-amount determining unit 202 comprises an electric-power-versus-quality-correlation-coefficient computing sub-unit 1001, an customer-classified-electric-power-transmission-amount determining sub-unit 1002, an electric-power-versus-quality-correlation data base 1003 and an electric-power-quality-constraint data base 1004. The electric-power-versus-quality-correlation-coefficient computing sub-unit 1001 computes a correlation between the quality of electric power for an customer 103 and the amount of electric power transmitted by an electric-power supplier 101. The electric-power-versus-quality-correlation data base 1003 is used for storing each correlation between the quality of electric power for an customer 103 and the amount of electric power transmitted by an electric-power supplier 101 obtained as a result of computation by the electric-power-versus-quality-correlation-coefficient computing sub-unit 1001. The electric-power-quality-constraint data base 1004 is used for storing information on quality constraints prescribed in each contract made between an customer 103 and an electric-power supplier 101. The customer-classified-electric-power-transmission-amount determining sub-unit 1002 corrects a total of magnitudes of electric-power demands requested by the customers 103-*a* to 103-*m* as obtained from the information gathering unit 201 in order to supply cheap electric power satisfying minimum qualities of electric power, from information of the electric-power-versus-quality-correlation data base 1003 and the electric-power-quality-constraint data base 1004 for each customer 103. First of all, the electric-power-versus-quality-correlation-coefficient computing sub-unit 1001 finds a coefficient table 1101 shown typically in FIG. 11. The table 1101 represents a relation between a voltage sustaining rate and a sensitivity of electric power transmitted by each electric-power supplier 101 for each customer 103 receiving the electric power. In the table 1101, the customers 103-*a* to 103-*m* are listed vertically whereas the electric-power suppliers 101-*a* to 101-*n* are listed horizontally. A symbol ○ in the table denotes a number representing a sensitivity coefficient indicating the degree of contribution of electric power transmitted by an electric-power supplier 101 to an electric-power quality of an customer 103. The table 1101 shows an example of using voltage sustaining rates as an index. It should be noted, however, that a system-reliability index other than the voltage sustaining rate such as a harmonic-generation rate or a frequency average value can also be used. It is also worth noting that, in the case of a plurality of indexes, a sensitivity table 1101 can be created separately for each index or a single sensitivity table can be created for all the indexes. In addition, the table 1101 is a sensitivity table for an amount of electric power transmitted by an electric-power supplier 101. It should be noted, however, that it is also possible to find a relation between a terminal voltage of an electric-power generating facility employed in an electric-power supplier 101 and a voltage sustaining rate of each customer 103.

Next, a table 1102 representing typical data stored in the electric-power-quality-constraint data base 1004 is explained. The electric-power-quality-constraint data base 1004 is all but the same as the electric-power-quality data base 205. The table 1102 shows constraints on the quality of electric power for each customer 103. The constraints can also be replaced by constraints on the quality of electric power related to the amount of electric power on a transformer bus for transmitting electric power to each customer 103 connected to the community power pool 102. The horizontal axis of each graph shown in the table 1102 represents the times of the day and the vertical axis represents the value of an index. A darkened portion represents an area in which the value of an index should exist. It should be noted that such a constraint does not remain unchanged throughout the year. Instead, the constraint may have a pattern varying from season to season or from day to day.

Figure 12:
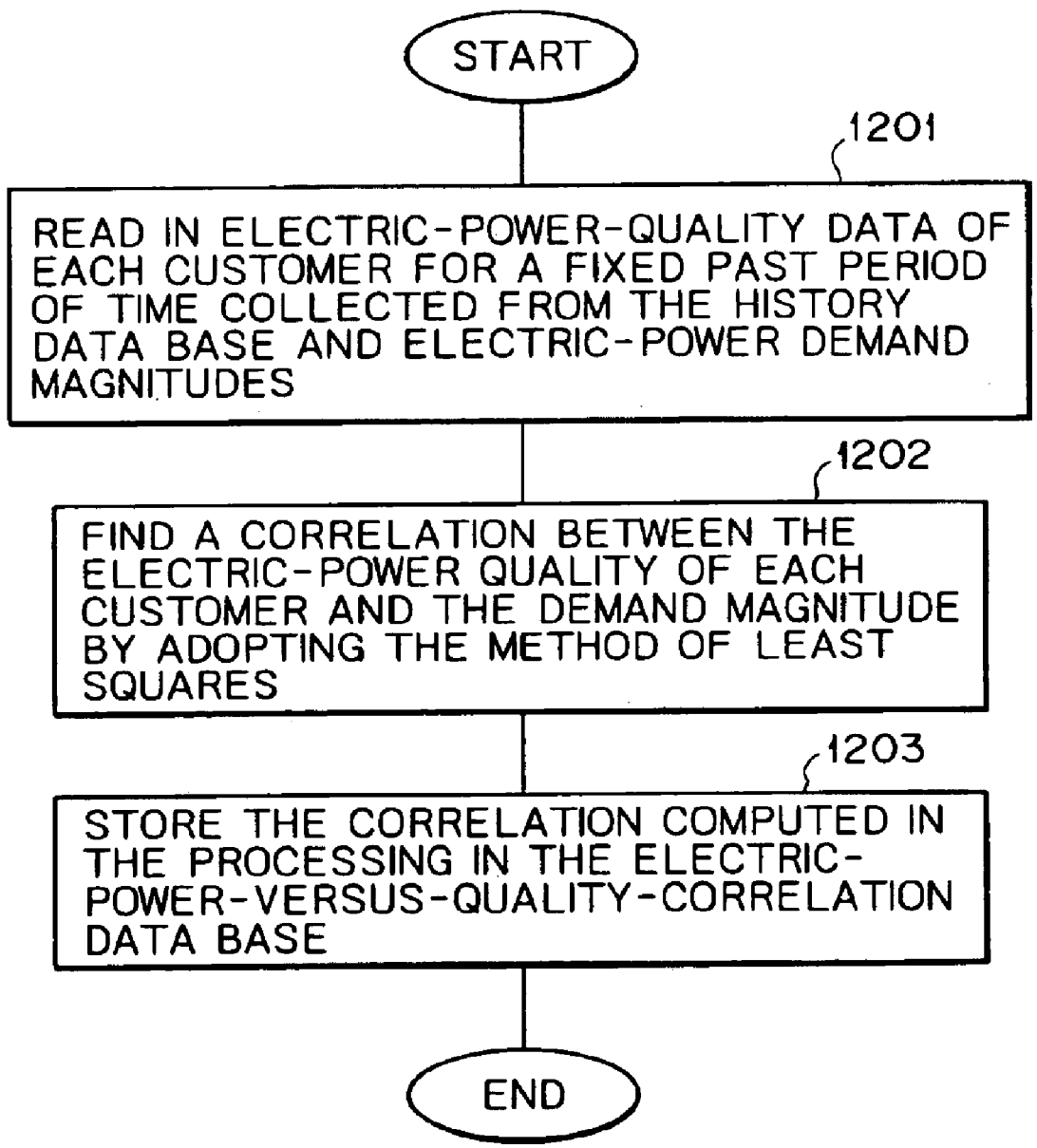
FIG. 12 is a flowchart representing an embodiment implementing an electric-power-versus-quality-correlation-coefficient computing sub-unit.

Next, processing carried out by the electric-power-versus-quality-correlation-coefficient computing sub-unit 1001 is explained by referring to a flowchart shown in FIG. 12. The following description is based on the assumption that, in the embodiment, an effect of each electric-power supplier 101 on an electric-power quality for an customer 103 can be approximated by a linear equation. The relation is modeled as follows:

$$\text{Quality}_i = a_{i1}x_1 + a_{i2}x_2 + \ldots + a_{in}x_n \quad (1)$$

where

Quality$_i$: an electric-power quality index for an customer i $a_{in}$: a quality correlation coefficient between the electric-power quality of an customer i and an electric-power supplier n $x_n$: an electric-power supplier n: the number of involved electric-power suppliers i=1, ..., m: the numbers of customers m: the number of customers It should be noted that in order to carry out computation at a high speed with accuracy to a certain degree, approximation based on a linear equation (1) is adopted in this embodiment. In order to produce an accurate result of the computation, however, a complex nonlinear equation can also be used. In the first processing 1201 of the flowchart shown in FIG. 12, electric-power-quality index of each customer 103 for a fixed past period of time collected from the history data base 204 and amounts of electric power purchased earlier by the demand control apparatus 107 employed in the community power pool 102 from electric-power suppliers 101 are read in to be substituted respectively for $F_1$ and $P_2$ in Eq. (2) given below. The electric-power-quality index includes voltage sustaining rates and harmonic-generation rates.

$$F = g(P, V) \quad (2)$$

where g: a function $F = (F_1, F_2, \ldots, F_m)$ $P = (P_1, P_2, \ldots, P_n)$ $V = (V_1, V_2, \ldots, V_n)$ $F_i$: an electric-power quality index for an customer i where i=1, ..., m $P_j$: an amount of electric power supplied by an electric-power supplier j where j=1, ..., n $V_j$: terminal voltage of an electric-power generating facility employed in an electric-power supplier j where j=1, ..., n In this case, as the fixed past period of time 1 week is long enough. However, a trend of variations in load in the area may require a period of time longer or shorter than 1 week during which history data is read in. In the next processing 1202, a correlation between the electric-power quality of each customer 103 and electric power supplied by electric-power supplier 101 is found by using a method of least squares based on data collected in the processing 1201. It should be noted that, since finding the correlation by using the method of least squares is described in detail in a reference with a title of "Introduction to Multivariable Analyses Part" authored by Noriaki Kawaguchi and published by Morikita Publishing Company in the year of 1973, no detailed description of the method is included in this specification. Data calculated in this processing is stored in what is denoted by the symbol ○ in the coefficient table 1101 shown in FIG. 11.

The correlation computed in the processing 1202 is stored in the electric-power-versus-quality-correlation data base 1003 in the next processing 1203. It should be noted that, if a plurality of electric-power quality indexes are assumed to exist in the processing 1202, it is necessary to carry out the processing shown in FIG. 12 as many times as the electric-power quality indexes, that is, one execution of the processing for each index. In this embodiment, a correlation between the electric-power quality of each customer 103 and the amount of electric power transmitted by an electric-power supplier 101 as well as the electric-power supplier 101 is found as described above. It is worth noting, however, that a correlation between the electric-power quality index of each customer 103 and the magnitude of a voltage appearing at a facility employed in an electric-power supplier 101 can he found instead.

Next, processing carried out by the customer-classified-electric-power-transmission-amount determining sub-unit 1002 is explained by referring to a flowchart shown in FIG. 13. It is the object of the customer-classified-electric-power-transmission-amount determining sub-unit 1002 to correct a demand magnitude required by the customers 103-a to 103-m to an amount of transmitted electric power satisfying a minimum reliability based on the aforementioned contracts made with the customers 103-a to 103-m on the basis of the electric-power-quality correlation between an electric-power supplier 101 and each customer 103 found by the electric-power-versus-quality-correlation-coefficient computing sub-unit 1001 as described above. If the corrected amount of transmitted electric power is smaller than the predicted demand magnitude described earlier, the amount of electric power purchased by the community power pool 102 as a whole decreases, giving rise to an effect of a reduced total electric-power cost. As typical processing, first of all, in processing 1301, an equation (Eq. 2) relating the electric-power quality of an customer 103 with the amount of electric power supplied by an electric-power supplier 101 and a voltage appearing at a terminal of a facility of the electric-power supplier 101 is set. Then, as an objective function, a sum of expressions on the right-hand side of Eq. (2) for all the customers 103-a to 103-m is minimized as shown by Eq. (3) given below in order to achieve the object of the customer-classified-electric-power-transmission-amount determining sub-unit 1002, that is, in order to correct a demand magnitude required by the customers 103-a to 103-m to an amount of transmitted electric power satisfying a minimum reliability based on the aforementioned contracts made with the customers 103-a to 103-m.

Objective Function $$\sum_{i=1}^{m} F_i \to \text{Min} \quad (3)$$

It should be noted that, as time constraints for solving Eq. (3), data stored in the electric-power-quality-constraint data base 1004 is used. Functions expressed by Eq. (4) are obtained on the assumption of being linearly approximatable. In order to solve Eq. (3) by adopting the linear-programming technique, Eq. (2) is differentiated to result in Eq. (4) which linearly relates variations in electric-power quality of an customer with variations in amount of electric power supplied by an electric-power supplier 101 and variations in voltage appearing at a terminal of a facility of the electric-power supplier 101.

$$\Delta F_1 = \frac{\partial g}{\partial P_1} \Delta P_1 + \ldots + \frac{\partial g}{\partial P_1} \Delta P_n + \frac{\partial g}{\partial V_1} \Delta V_1 + \ldots + \frac{\partial g}{\partial V_1} \Delta V_n \quad (4)$$

$$\vdots$$

$$\Delta F_m = \frac{\partial g}{\partial P_m} \Delta P_1 + \ldots + \frac{\partial g}{\partial P_m} \Delta P_n + \frac{\partial g}{\partial V_m} \Delta V_1 + \ldots + \frac{\partial g}{\partial V_m} \Delta V_n$$

where
$\Delta F_i$: an electric-power quality index of an customer i where i=1, ..., m
$\Delta P_1$: an amount of electric power supplied by an electric-power supplier j where j=1, ..., n
$\Delta V_i$: a voltage appearing at a terminal of an electric-power-generating facility of the electric-power supplier j where j=1, ..., n $\frac{\partial g}{\partial P_1}, \frac{\partial g}{\partial V_1}$: sensitivity coefficients Eq. (4) determines the amount of electric power to be distributed to each customer 103 eventually.

Found by the electric-power-versus-quality-correlation-coefficient computing sub-unit 1001 and stored in the electric-power-versus-quality-correlation data base 1003, the sensitivity coefficients form a coefficient matrix for solving Eq. (3) by adoption of the linear-programming technique in the processing 1301. Results produced in the processing 1301 are then used in the next processing 1302 to find solutions by adopting the simplex technique. If an outcome of a judgment formed in the next processing 1303 indicates that no solution is found in the processing 1302, the constraints stored in the electric-power-quality-constraint data base 1004 are relieved in processing 1304. A step to relieve the constraints is determined in advance. Typically, the constraints are each relieved by 5% at one time. If the outcome of the judgment formed in the processing 1303 indicates that a solution has been found in the processing 1302, on the other hand, the results are stored in the electric-power-transmission-amount data base 206 in processing 1305. The processing is then continued to processing carried out by the electric-power ordering unit 203.

The electric-power ordering unit 203 orders an amount of electric power required at that time and stored in the electric-power-transmission-amount data base 206 from each electric-power supplier 101 through the communication facility 121.

Figure 14:
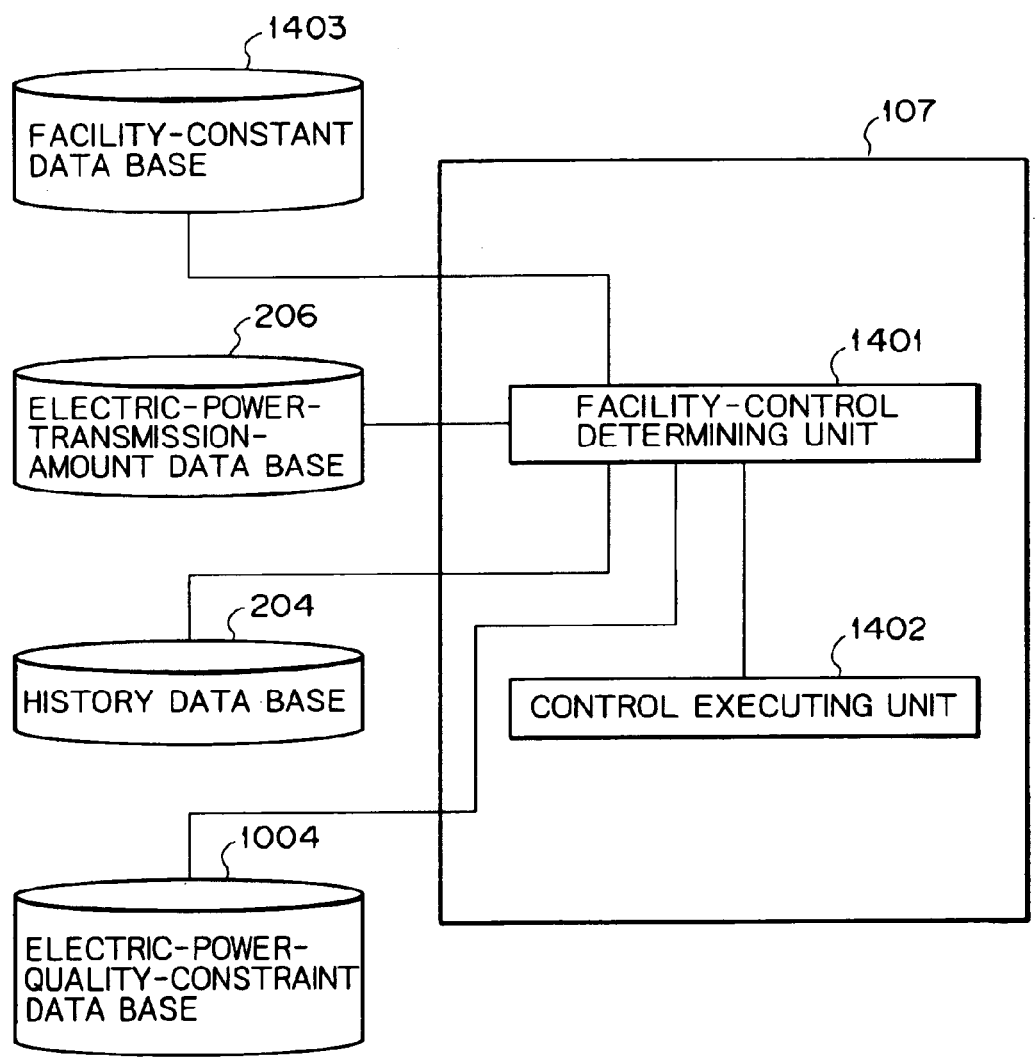
FIG. 14 is a diagram showing an embodiment implementing a demand control apparatus.

Next, details of the demand control apparatus 107 are explained by referring to FIG. 14. As shown in the figure, the demand control apparatus 107 comprises a facility-control determining unit 1401 and a control executing unit 1402 which make accesses to a facility-constant data base 1403, the electric-power-transmission-amount data base 206, the history data base 204 and the electric-power-quality-constraint data base 1004. An example of the facility-constant data base 1403 will be described later. It should be noted that the electric-power-transmission-amount data base 206 and the history data base 204 are the same as those shown in FIG. 8.

Figure 15:
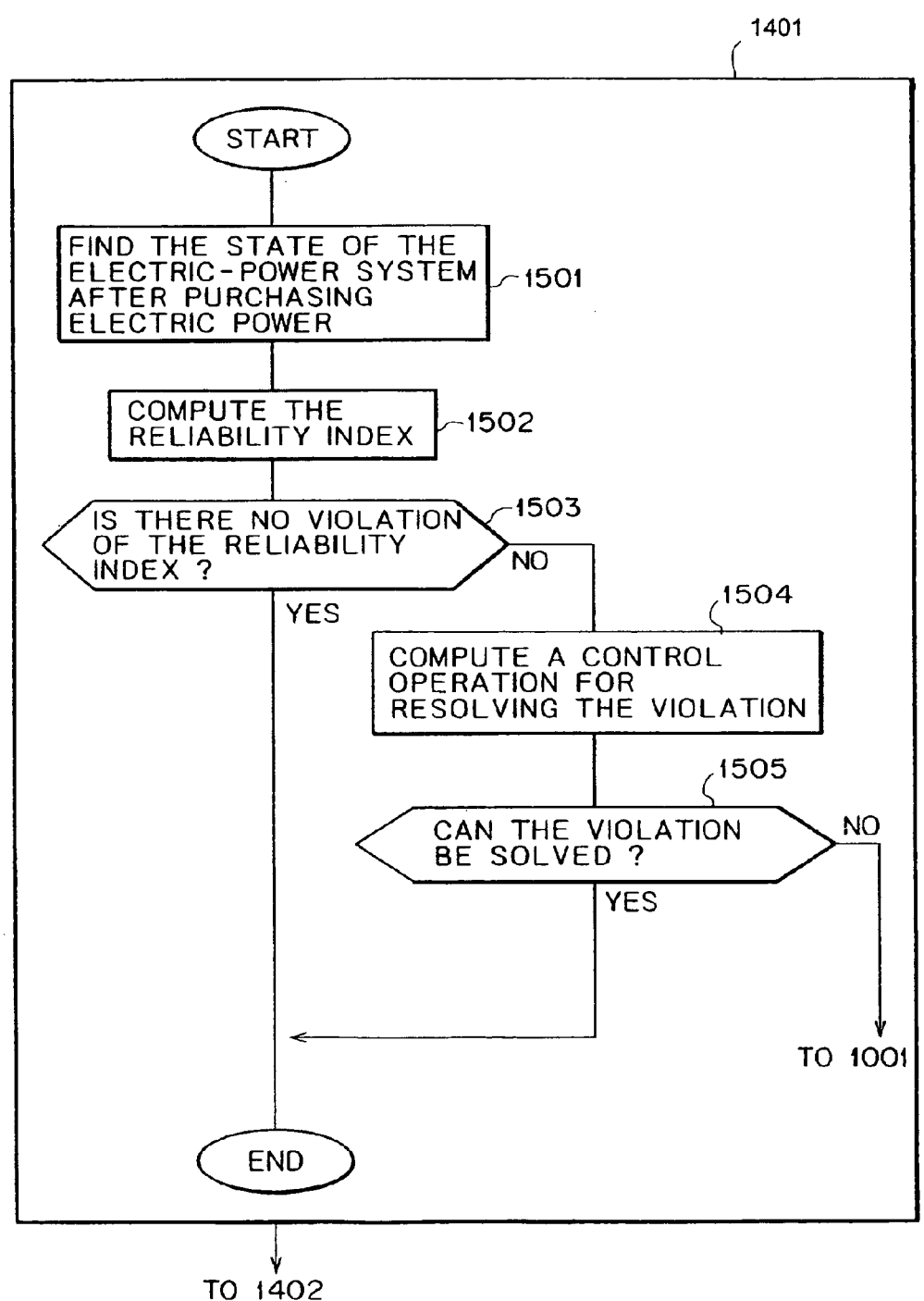
FIG. 15 is a flowchart representing a typical facility-control executing apparatus.

Next, details of the facility-control determining unit 1401 are described by referring to a flowchart shown FIG. 15. It is an object of the facility-control determining unit 1401 to form a judgment as to whether or not there is a violation of a constraint of a new facility operation observed in a process of actually supplying electric power purchased from an electric-power supplier 101 as determined by the electric-power-purchase determining apparatus 106 to the electric-power system and, if it is quite within the bounds of possibility that a constraint violation occurs, to execute control to avoid such a violation in advance. As shown in FIG. 15, the flowchart begins with processing 1501 in which the state of the electric-power system after the purchase of electric power is identified by executing application software such as an alternating-current-method power-flow computation based on information stored in the facility-constant data base 1403 and amounts of electric power purchased from electric-power suppliers 101-*a* to 101-*n* determined by the purchased-electric-power-amount determining unit 202 in order to detect the presence/absence of a violation of a constraint on a new electric-power quality. Data for implementing the alternating-current-method power-flow computation is information stored in the facility-constant data base 1403, that is, facility constants of transmission lines and transformers of the electric-power system which are controlled by the community power pool 102. To be more specific, the facility constants include resistance values, inductance values and capacitance values of the transmission lines and the transformers, and termination names of a transmission line connecting a tap ratio of each of the transformers as denoted by reference numeral 1601 in FIG. 16. In the figure, reference numeral 1602 denotes loads used in the implementation of the alternating-current-method power-flow computation, that is, reception conditions imposed by a customer 103. The reception conditions include the voltage of each load bus, the reactive power of each load, the active power of each load, the reactive power and the active power of a generator in the case of customers 103 receiving electric power also from a distributed-type power supply such as an IPP.

In the next processing 1502, reliability indexes of the electric-power system controlled by the community power pool 102 are computed. In this processing, the presence/absence of a violation of a new voltage quality and the presence/absence of a generation of an excessive transmission-line load in the plan of purchasing electric power found earlier are determined by comparing results of the alternating-current-method power-flow computation done in the processing 1501 with information stored in the electric-power-quality-constraint data base 1004. If an outcome of a judgment formed in the next step 1503 indicates that no violation of a new constraint is detected, the processing is completed without carrying out any further processing. If the outcome of the judgment formed in the next step 1503 indicates that a violation of a new constraint is detected, on the other hand, a control operation for solving the violation of the constraint is computed in step 1504. An example of a method to compute an actual control operation for solving a violation of a constraint is described in detail in a reference with a title of "Power Security System Control Calculations Using Linear Programming Part I" and "Power Security System Control Calculations Using Linear Programming Part II" authored by B. Scott and E. Hobson, IEEE Trans. PAS, 97(1978), 1713–1731.

After a control operation for solving the violation of the constraint is computed by using the method described in this reference, a judgment is formed in the next processing 1505 to determine whether or not such an operation exists. If an operation for solving the violation of the constraint exists, the operation is carried out in the processing 1402 of the flowchart shown in FIG. 14. If an operation for solving the violation of the constraint does not exist, on the other hand, the processing of the purchased-electric-power-amount determining unit 202 is carried out again.

Figure 17:
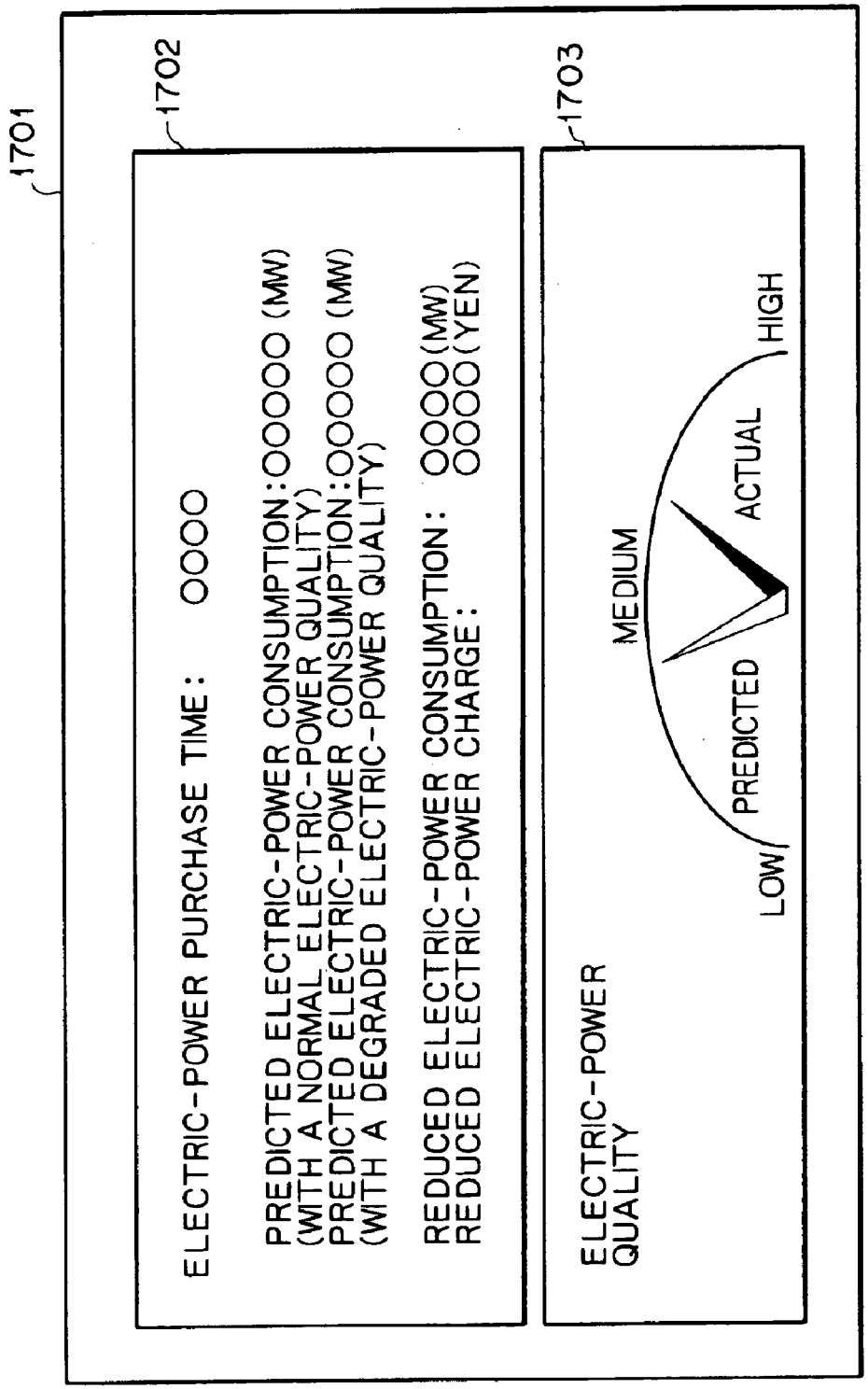
FIG. 17 is a diagram showing a typical information output screen in a community power pool.

FIG. 17 is a diagram showing a typical information output screen 1701 in the community power pool 102. In actuality, the screen 1701 can be displayed in the community power pool 102 or an information terminal installed in an customer 103 and connected to the community power pool 102 through the communication facility 122. Reference numeral 1702 denotes a typical sub-screen displaying information on amounts of electric power reduced by changing electric-power qualities, and reference numeral 1703 denotes a typical sub-screen displaying differences in electric-power quality between electric-power qualities before and after the changes. Information other than that displayed on the screen 1701 such as a harmonic-generation rate, a voltage and a frequency of the electric-power system in this local area can also be displayed.

By virtue of the community power pool 102 provided by the present invention as described above, it is possible to control supplying of electric power with a minimum reliability index satisfied and a total demand magnitude in a control execution area minimized.

Figure 18:
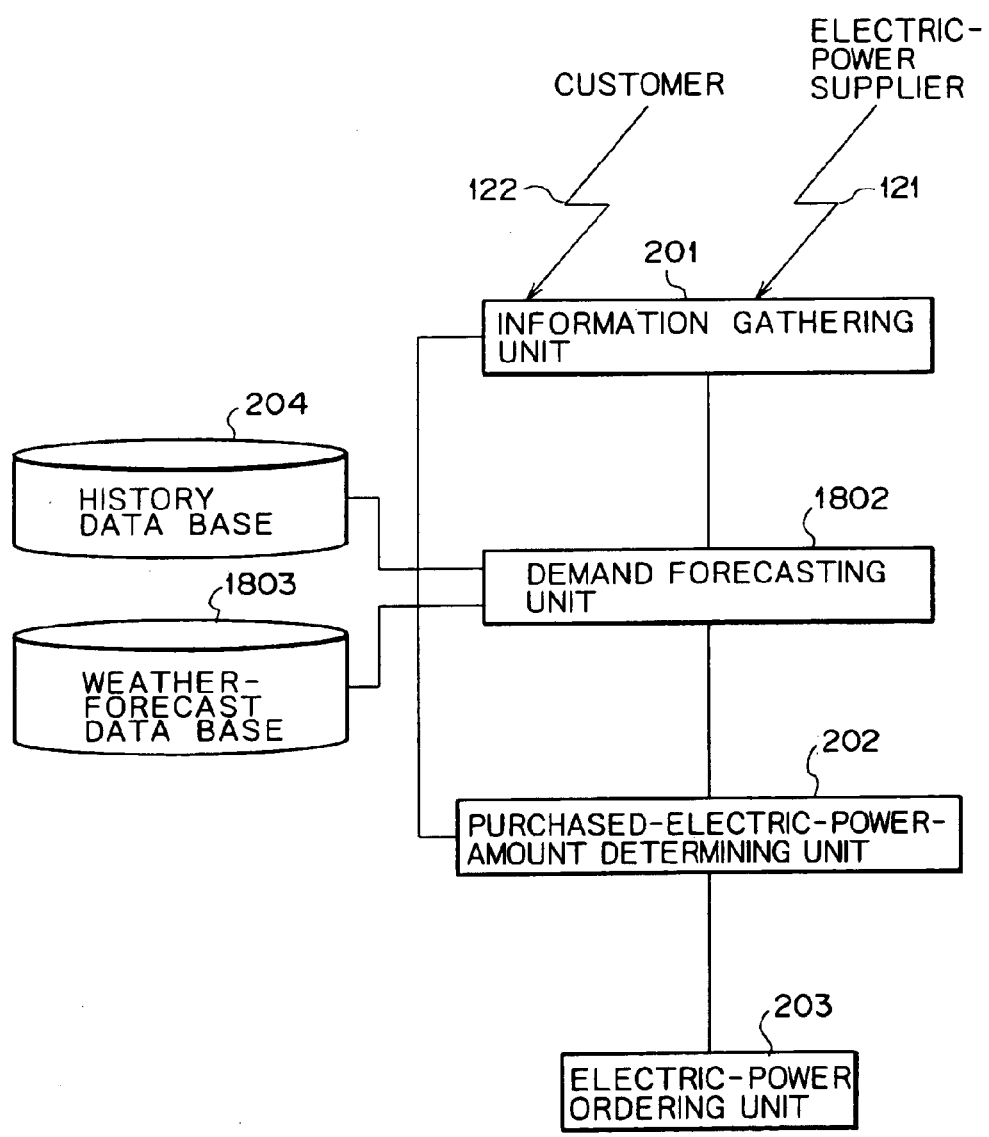
FIG. 18 is a diagram showing a second embodiment implementing a purchased-electric-power-amount determining unit.

Next, a second embodiment implementing the community power pool 102 is explained by referring to FIG. 18. The electric-power-purchase determining apparatus of the community power pool 102 is different from the electric-power-purchase determining apparatus 106 of the first embodiment in that the former includes a demand forecasting unit 1802 for forecasting amounts of electric power consumed by the customers 103 at the present time and at a time in the future. To put it in detail, the demand forecasting unit 1802 forecasts an amount of consumed electric power at a time in the future on the basis of history data stored in the history data base 204, demand data at the present time gathered by the information gathering unit 201 and weather-forecast data stored in a weather-forecast data base 1803. Reference numeral 2001 shown in FIG. 20 denotes typical data stored in the weather-forecast data base 1803. As shown in FIG. 20, the data 2001 stored in the weather-forecast data base 1803 is weather data including a weather condition, an atmospheric temperature, a humidity, an amount of insolation, scenery and a wind force/velocity for different times of the day.

Figure 19:
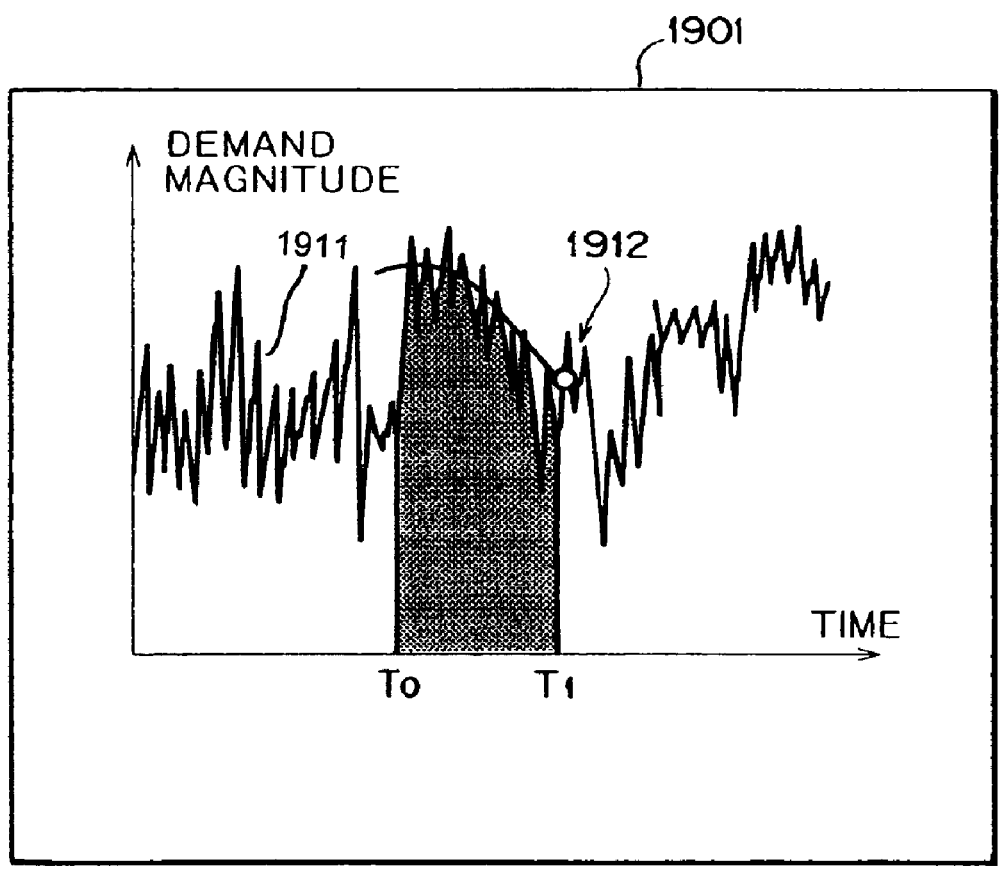
FIG. 19 is a diagram showing a typical demand curve of a customer consuming electric power.

A state of forecasting an electric-power demand magnitude is explained by referring to FIG. 19. Vertical axis represents the demand magnitude, and horizontal axis represents the time. Reference numeral 1901 shown in the figure denotes a curve representing typical changes in demand for electric power. Since an electric-power demand magnitude is predicted at intervals of several minutes to several tens of minutes, small variations 1911 in electric-power demand are observed with the lapse of time as shown in FIG. 19. Since it will be meaningless to pay attention to each of the small variations 1911, however, time-shiftable average values of demand magnitudes over a fixed period from the present point of time T1 to a retroactive point of time T0 is computed instead. In this embodiment, a demand magnitude corresponding to this time-shiftable average value is a forecast object. A thick line shown in FIG. 19 represents a transition of corrected actual data which is obtained by computing the time-shiftable average values. Reference numeral 1912 denotes a forecast result of the magnitude of a demand for electric power at the point of time T1.

Figure 21:
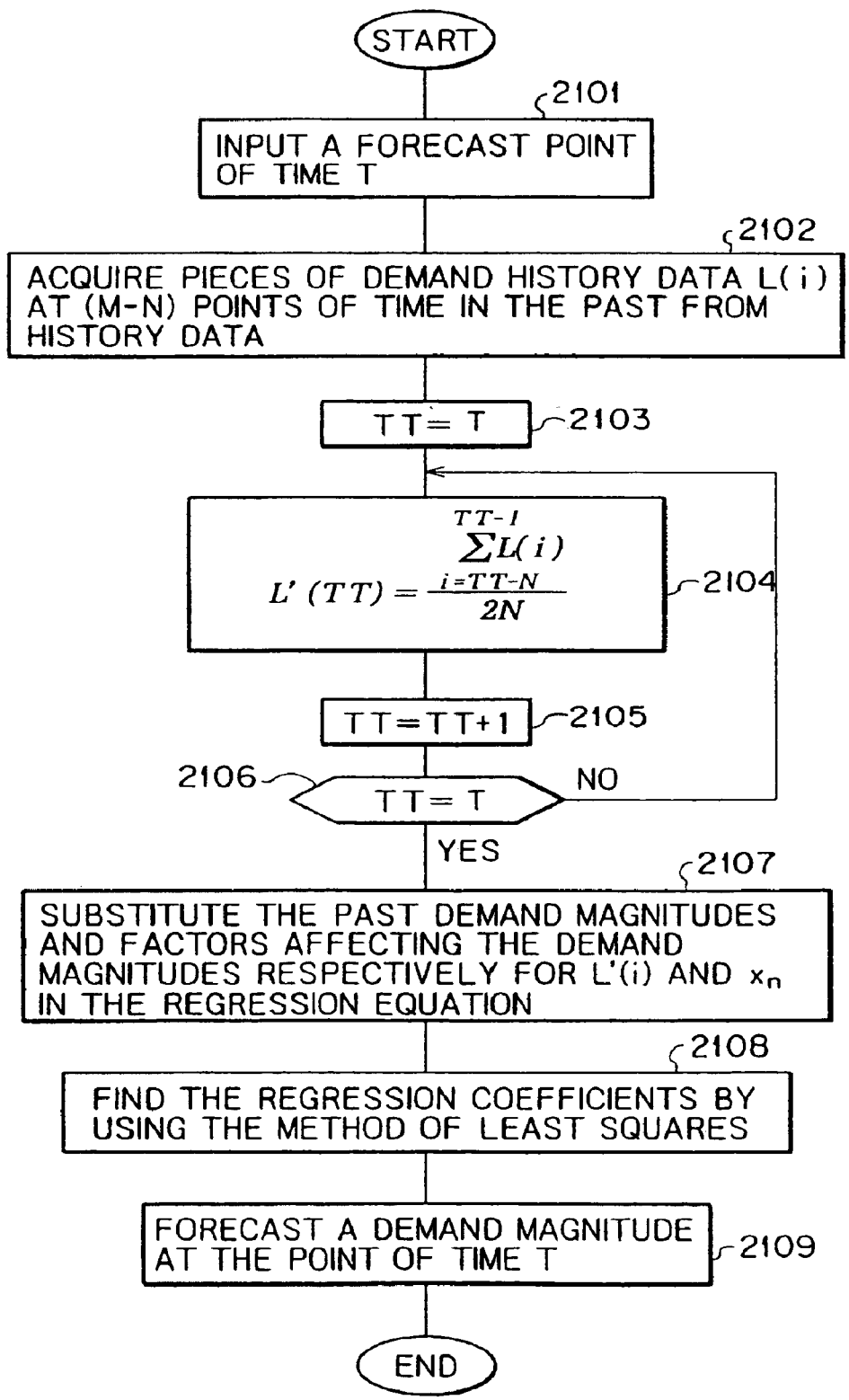
FIG. 21 is a flowchart representing a typical demand forecasting method.

Details of processing to find a demand magnitude by adopting the technique described above are explained by referring to a flowchart shown FIG. 21. As shown in the figure, the flowchart begins with processing 2101 in which a forecast point of time T is input or fetched in from a data base. In the next processing 2102, pieces of demand history data L(i) at (M−N) points of time in the past determined by the point of time T are read in. In the subsequent processing 2103, a counter variable TT is initialized at M. In the next processing 2104, a time-shiftable average value L' (TT) of quantity demands at a point of time TT is computed for N points of time starting with a point of time (TT−N) and ending with a point of time (TT−1) where TT is the value of the counter variable. In the next processing 2105, the counter variable TT is updated to a value representing a next point of time immediately succeeding a point of time represented by the present value. In the next processing 2106, the value of the counter variable TT is examined to determine whether or not the value is equal to T. If the value of the counter variable TT is not equal to T, the pieces of processing 2104 and 2106 are repeated till the value of the counter variable TT becomes equal to T. As the value of the counter variable TT becomes equal to T, the past demand magnitudes found in the pieces of processing 2102 to 2106 and factors affecting the demand magnitudes are substituted respectively for L' and $x_n$ in the following regression equation in processing 2107.

$$L' = a_1 x_1 + a_2 x_2 + \ldots + a_n x_n$$

where $a_n$: coefficients of the regression equation $x_n$: factors affecting the demand magnitudes In the next processing 2108, the regression coefficients $a_n$ are found by using the method of least squares based on results of the substitution. In the last processing 2109, a demand magnitude at the point of time T is predicted on the basis of data stored in the weather-forecast data base 1803.

By virtue of the community power pool 102 implemented by the second embodiment of the present invention as described above, it is possible to execute electric-power demand control with a high degree of accuracy with a minimum reliability index satisfied and a total demand magnitude in a control execution area minimized.

Figure 22:
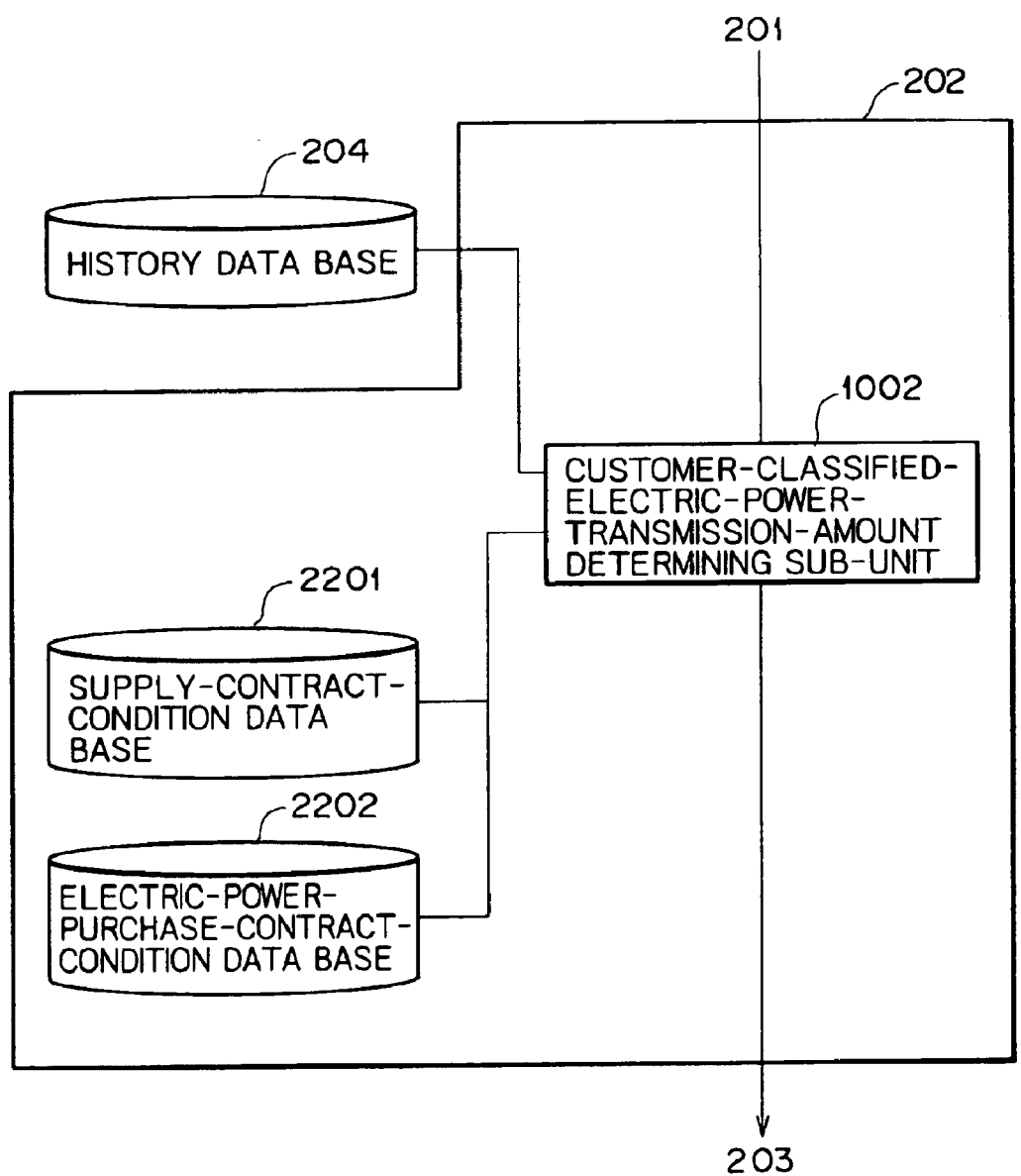
FIG. 22 is a diagram showing a typical purchased-electric-power-amount determining unit.

The following is a description of a third embodiment implementing the community power pool 102 provided by the present invention. The electric-power-purchase determining apparatus 106 employed in the third embodiment implementing the community power pool 102 provided by the present invention has a supply-contract-condition data base 2201 for storing electric-power supply contracts made between the community power pool 102 and individual customers 103, an electric-power-purchase-contract-condition data base 2202 for storing electric-power purchase contracts made between the community power pool 102 and individual electric-power suppliers 101 and a purchased-electric-power-amount determining unit 202 for determining amounts of purchased electric power for each customer 103 on the basis of the contracts stored in the data bases 2201 and 2202. Details of the electric-power-purchase determining apparatus 106 employed in the third embodiment are explained by referring to FIG. 22. Data stored in the supply-contract-condition data base 2201 and the electric-power-purchase-contract-condition data base 2202 is used by the customer-classified-electric-power-transmission-amount determining sub-unit 1002 for determining an amount of transmitted electric power based on the contract conditions for each customer 103. Typical examples of data stored in the supply-contract-condition data base 2201 and the electric-power-purchase-contract-condition data base 2202 are shown in FIG. 23.

Figure 23:
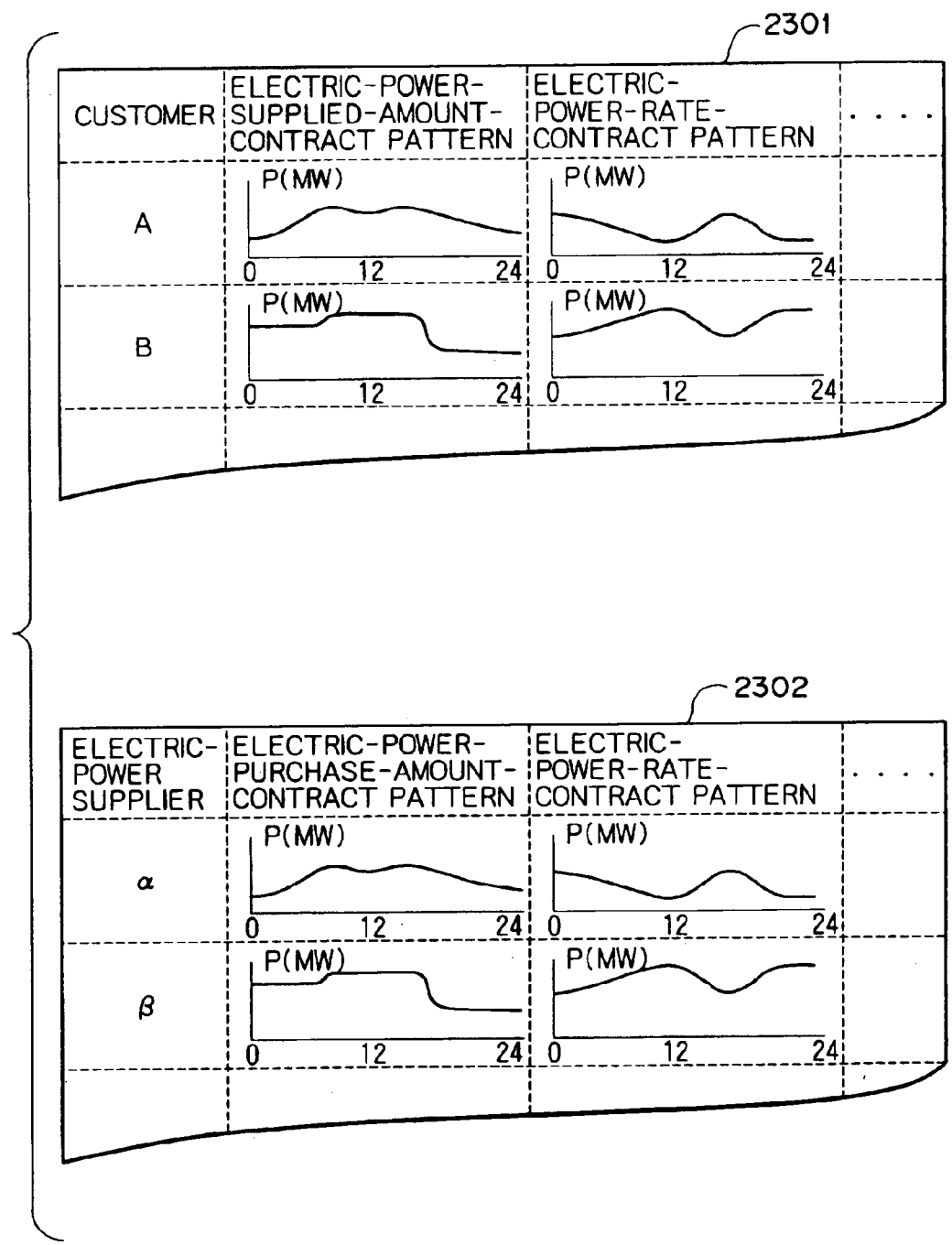
FIG. 23 is diagrams each showing a data base storing electric-power demand/supply contracts.

In FIG. 23, reference numeral 2301 denotes typical contracts made between the community power pool 102 and customers 103. As shown in the figure, the community power pool 102 enters a contract with each customer 103 from the beginning with the contract being represented by an electric-power-supplied-amount-contract pattern and an electric-power-rate-contract pattern. On the other hand, reference numeral 2302 denotes typical contracts made between the community power pool 102 and electric-power suppliers 101. Like the contracts 2301, each contract 2302 is represented by an electric-power-purchase-amount-contract pattern and an electric-power-rate-contract pattern.

Figure 24:
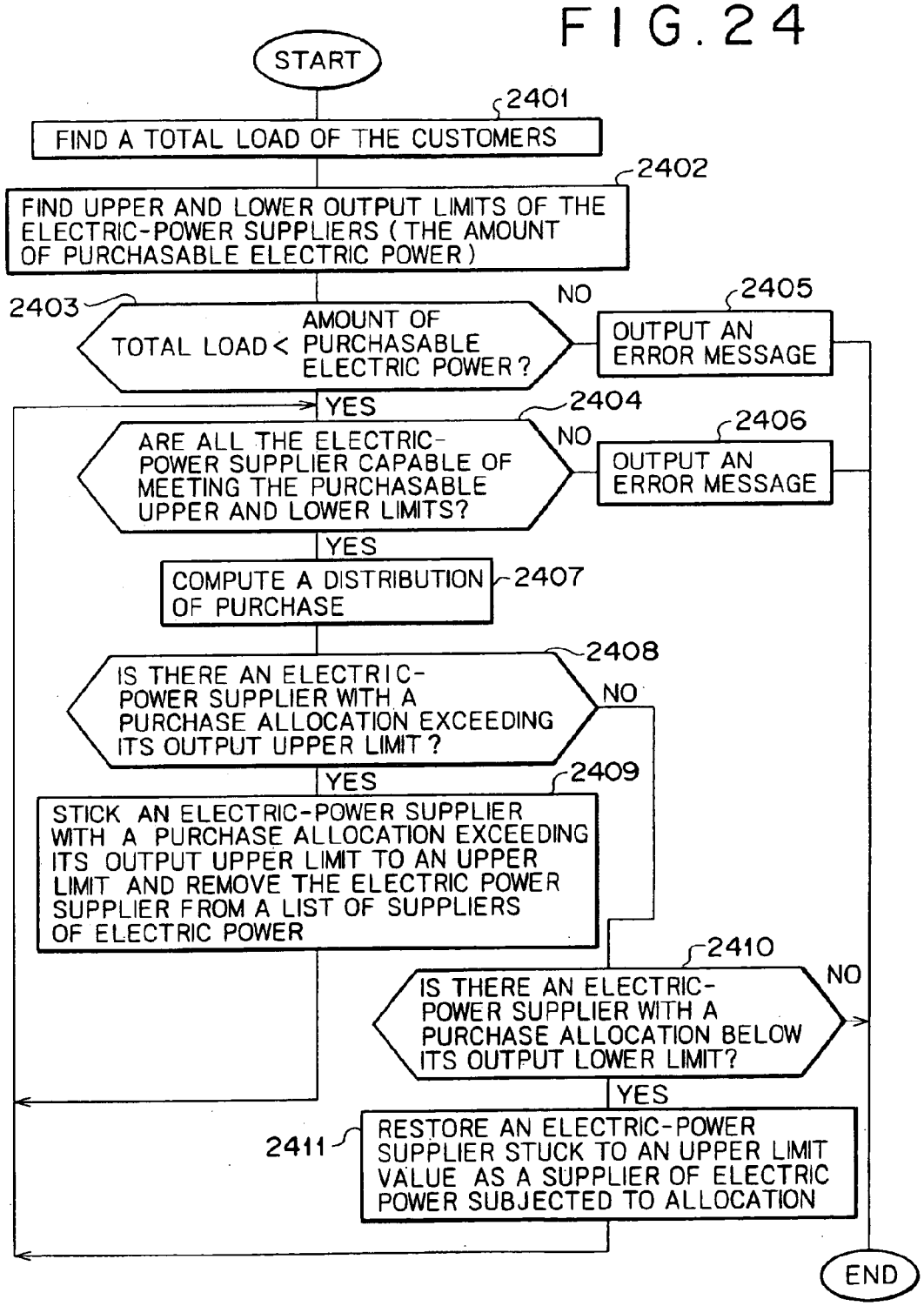
FIG. 24 is a typical flowchart representing an electric-power distributing algorithm.

Next, details of processing carried out by the customer-classified-electric-power-transmission-amount determining sub-unit 1002 employed in the third embodiment are explained by referring to a flowchart shown in FIG. 24. As shown in the figure, the flowchart begins with processing 2401 to find a total of electric-power demand magnitudes received from customers 103 through the communication facility 122. In the next processing 2402, the upper and lower output limits of each electric-power supplier 101 are found to determine an amount of electric power that the community power pool 102 can purchase. In the next processing 2403, the total demand found in the processing 2401 is compared with the total supply found in the processing 2402. If the total supply is smaller than the total demand, an error message is displayed in processing 2405. The processing is then continued to the processing carried out by the demand control apparatus 107.

If the total supply is greater than the total demand, on the other hand, it is necessary to turn down electric power supplied by some electric-power suppliers 101 so redistribution of the electric-power purchase needs to be determined. In this case, the upper and lower supply output limits of each electric-power supplier 101 are examined in processing 2404 to find out if all the electric-power supplier 101 are capable of meeting the purchasable upper and lower limits. If all the electric-power supplier 101 are capable of meeting the purchasable upper and lower limits, a purchase distribution is found in processing 2407. Otherwise, an error message is displayed in processing 2406. The processing is then continued to the processing carried out by the demand control apparatus 107. The purchase distribution calculated in the processing 2407 is an economic load distribution by substitution of the electric-power-rate-contract patterns presented by the electric-power suppliers 101 for fuel costs as disclosed in a reference with a title of "Electric Power System Engineering" authored by Yasuji Sekine, Junichi Toyota, Muneaki Hayashi, Yasuo Serizawa and Jun Hasegawa and published by Corona Corporation in the year of 1979. Results are supplied to the next processing 2408 to form a judgment as to whether or not an electric-power supplier 101 with a purchase allocation exceeding the output upper limit thereof exists. If an electric-power supplier 101 with a purchase allocation exceeding the output upper limit thereof exists, the flow continues to processing 2409 in which the electric-power supplier 101 with a purchase allocation exceeding the output upper limit thereof is stuck to an upper limit value and removed from a list of suppliers of electric power. The flow then returns to the processing 2404 to compute the purchase distribution once again. If an electric-power supplier 101 with a purchase allocation exceeding the output upper limit thereof does not exist, on the other hand, the flow continues to processing 2410 to form a judgment as to whether or not an electric-power supplier 101 with a purchase allocation below the output lower limit thereof exists. If an electric-power supplier 101 with a purchase allocation below the output lower limit thereof exists, the flow continues to processing 2411 in which an electric-power supplier 101 stuck to an upper limit value is restored as a supplier of electric power subjected to allocation. The flow then returns to the processing 2404 to compute the purchase distribution once again. If an electric-power supplier 101 with a purchase allocation below the output lower limit thereof does not exist, on the other hand, the processing of this embodiment is completed since all electric-power suppliers 101 each having an amount of electric power allocated thereto within the output upper and lower limits thereof have been identified.

Figure 25:
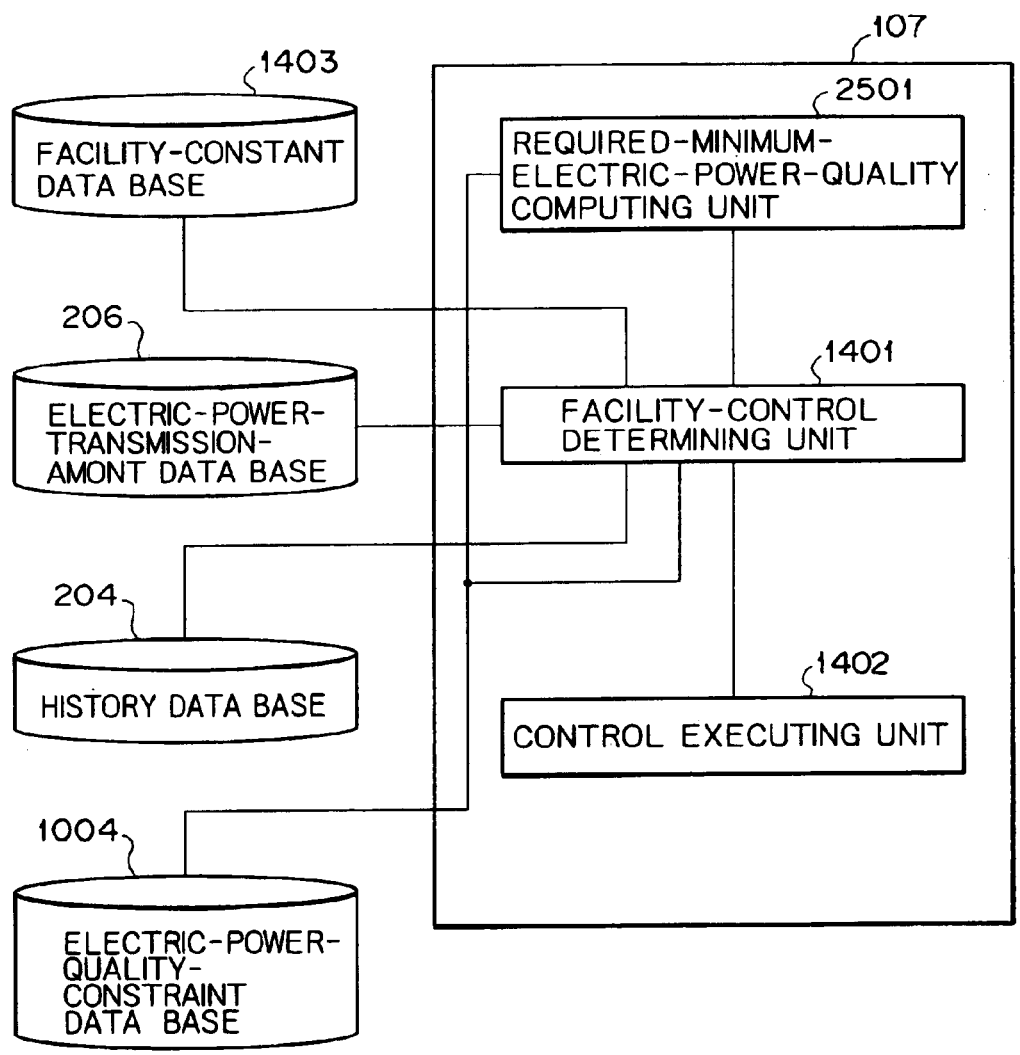
FIG. 25 is a diagram showing an embodiment implementing a demand control apparatus.

Next, the demand control apparatus 107 employed in the third embodiment is explained by referring to FIG. 25. As shown in the figure, the demand control apparatus 107 employed in the third embodiment comprises a required-minimum-electric-power-quality computing unit 2501, the facility-control determining unit 1401, the control executing unit 1402, the facility-constant data base 1403, the electric-power-transmission-amount data base 206, the history data base 204 and the electric-power-quality-constraint data base 1004. The required-minimum-electric-power-quality computing unit 2501 is activated when an error message is generated in the processing 2405 or 2406 carried out by the customer-classified-electric-power-transmission-amount determining sub-unit 1002 employed in the electric-power-purchase determining apparatus 106. In the event of such an error message, the excessive or insufficient portion of the supplied electric power is reflected in the electric-power quality. To be more specific, in the case of an insufficient electric-power supply, the amount of supplied electric power is reduced by lowering the load voltage of the customer 103. In the case of an excessive electric-power supply, on the other hand, the amount of electric power consumed by the customer 103 is increased by raising the load voltage of the customer 103. The limits to which the electric-power quality can be sacrificed are computed by the required-minimum-electric-power-quality computing unit 2501 and stored in the electric-power-quality-constraint data base 1004.

Figure 26:
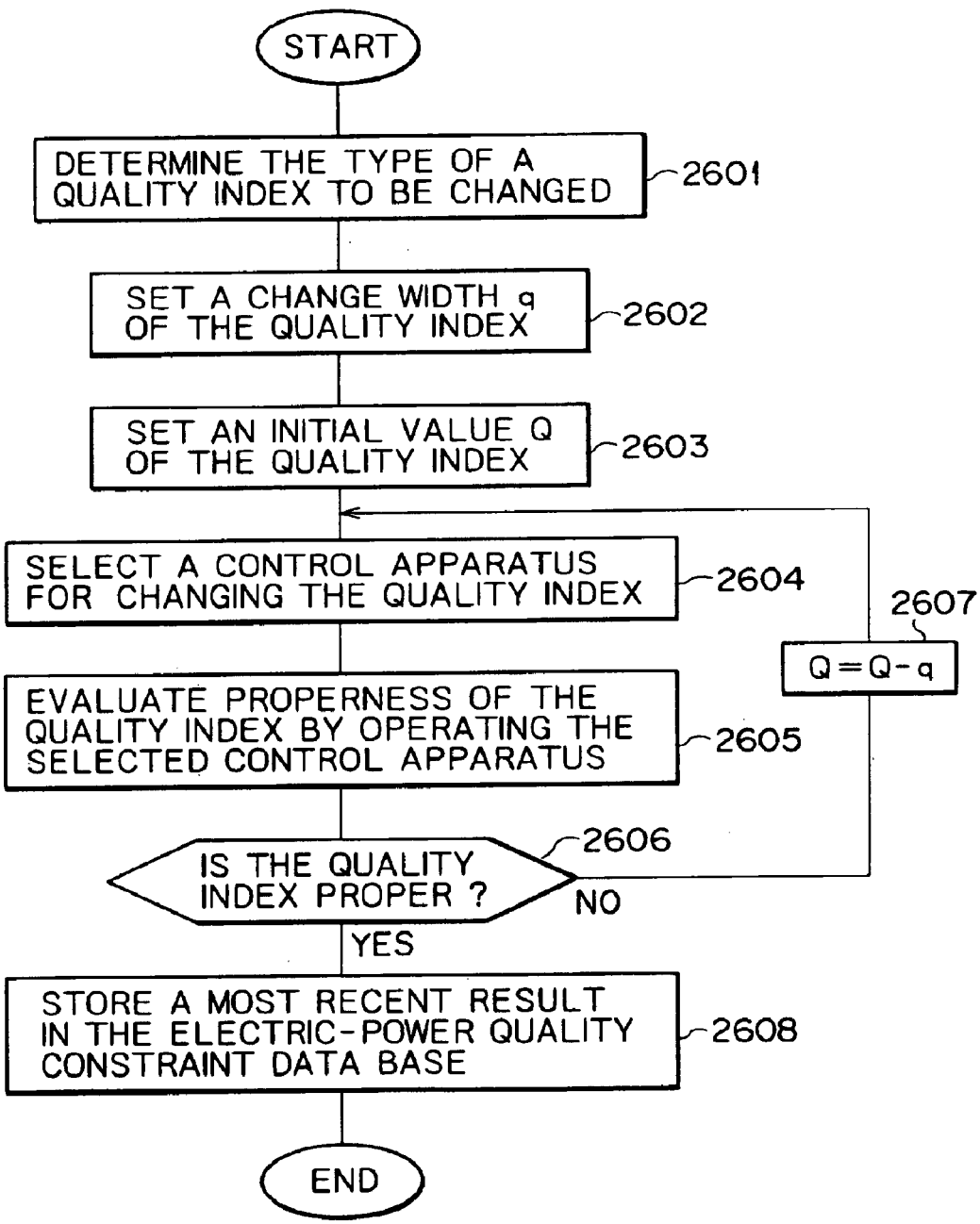
FIG. 26 is a typical flowchart representing computation of a minimum electric-power quality.
Figure 27:
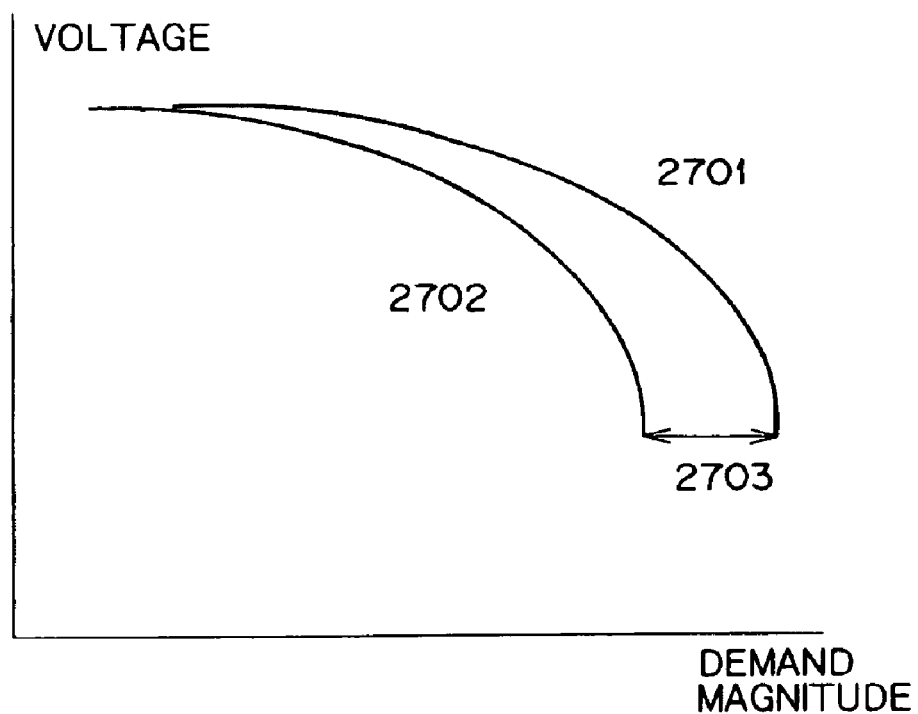
FIG. 27 is a diagram showing typical electric-power-quality indexes.

Next, details of processing carried out by the required-minimum-electric-power-quality computing unit 2501 are explained by referring to a flowchart shown in FIG. 26. As shown in the figure, the flowchart begins with processing 2601 at which the type of a quality index to be changed is set. In the next processing 2602, a change width q is determined. An example of the quality index to be changed is a voltage and a change width is set typically at 1%. In the next processing 2603, an initial value Q of the quality index is set. This value Q is used in the next processing 2604 to select a control apparatus for changing the quality index. A control apparatus can be selected by manually operating an apparatus of any arbitrary type to produce a change, or determined by adopting the optimization technique for the first embodiment explained earlier. The flow then goes on to processing 2605 to perform simulation for a case in which the control apparatus selected in the processing 2604 is operated. Then, the flow proceeds to processing 2606 to form a judgment based on a result of simulation as to whether or not the change is proper. For example, if a voltage is selected as a quality index, voltage-load curves 2701 and 2702 are produced after and before implementation of the control respectively as shown in FIG. 27. In this case, assume that maximum difference in load 2703 between the curves 2701 and 2702 is a threshold of 10%. Thus, a decrease in load smaller than the threshold is considered to be acceptable quality degradation. On the other hand, a decrease in load greater than the threshold is considered to be unacceptable quality degradation. The processing 2606 includes a judgment as to whether the decrease in load is acceptable or unacceptable quality degradation. If there is still room for further degrading the quality, the flow continues to processing 2607 to subtract the change width q from the initial value Q of the quality index and goes back to the processing 2604 to select a control apparatus for the new value of the quality index. If there is no longer room for further degrading the quality, on the other hand, the flow continues to processing 2608 in which the electric-power quality obtained as a most recent result of the control is stored in the electric-power-quality-constraint data base 1004.

Pieces of processing after the processing carried out by the required-minimum-electric-power-quality computing unit 2501 are carried out by the facility-control determining unit 1401 and the control executing unit 1402 in the same way as the second embodiment.

By virtue of the community power pool 102 implemented by the third embodiment of the present invention as described above, it is possible to execute electric-power demand control at a low cost with a minimum reliability index satisfied and a total demand magnitude in a control execution area minimized.

Figure 28:
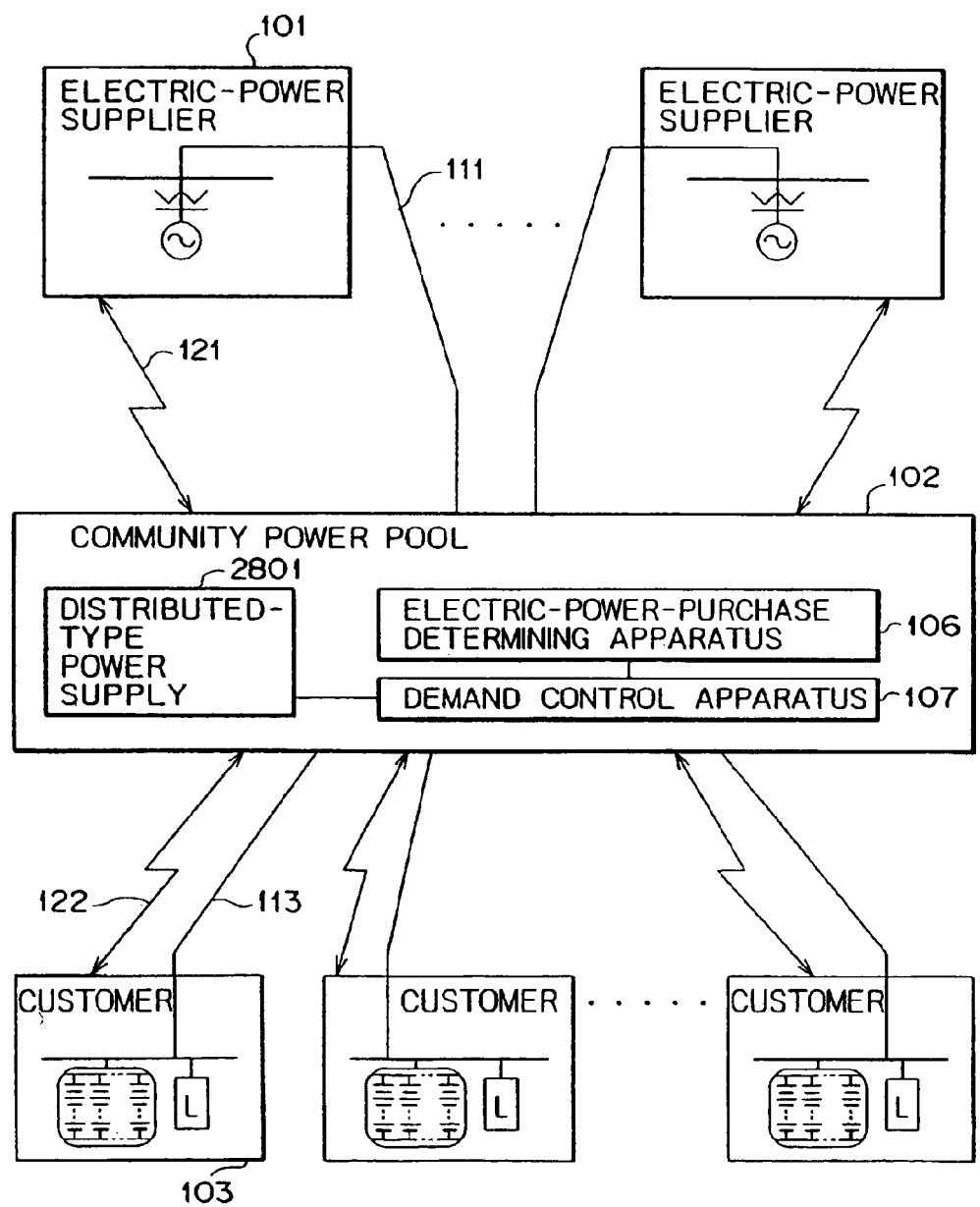
FIG. 28 is a diagram showing a typical community power pool.

Next, a fourth embodiment of the present invention is explained by referring to FIG. 28. In the fourth embodiment, the community power pool 102 is provided with a distributed-type power supply 2801 as shown in the figure. In general, electric power supplied by the distributed-type power supply 2801 is cheaper than electric power purchased from an electric-power supplier 101. Thus, electric power can be supplied to customers 103 at a lower cost. A total amount of electric power that can be generated by the distributed-type power supply 2801 is computed and then subtracted by the electric-power-purchase determining apparatus 106 from an amount of electric power to be purchased from electric-power suppliers 101 as determined by any one of the second to fourth embodiments. A result of the subtraction is supplied to the demand control apparatus 107 as a value used for controlling the amounts of electric power to be transmitted to customers 103.

By virtue of the system and method for controlling the community power pool 102 implemented by the fourth embodiment of the present invention as described above, it is possible to execute electric-power demand control at a low electric-power rate with a minimum reliability index satisfied.

As described above, the present invention provides a method for controlling a community power pool and a system adopting the method with the system comprising:

an electric-power-purchase determining apparatus; and a demand control apparatus for supplying electric power satisfying a minimum electric-power quality to customers in accordance with an amount of purchased electric power determined by the electric-power-purchase determining apparatus, wherein the electric-power-purchase determining apparatus comprises:

an information gathering unit for gathering information on amounts of electric power to be consumed by electric-power consuming facilities installed at customers and information supplied by electric-power suppliers;

a purchased-electric-power-amount determining unit used for computing an optimum amount of electric power to be actually purchased by changing an electric-power quality such as a frequency, a voltage and a harmonic-generation rate and an amount of electric power to be consumed by each customer based on present demand magnitudes collected from the information gathering unit and based on constraints on the electric-power quality of each customer stored in a contract-condition data base as well as used for determining which electric-power suppliers the electric power of the optimum amount is to be purchased from; and a facility-control command unit intended for detecting the presence/absence of an index newly violating a contract stored in the contract-condition data base in an customer to receive electric power purchased at an amount determined by the purchased-electric-power-amount determining unit from the demand control apparatus of the community power pool and intended for resolving a detected violation, if any, by controlling a facility in the customer controllable by the community power pool, so that it is possible to execute electric-power demand control at a low electric-power rate with a minimum reliability index satisfied and a total demand magnitude in a control execution area minimized.

What is claimed is:

1. An electric power supply control system for purchasing electric power from a plurality of electric-power suppliers and distributing purchased electric power to any arbitrary number of customers, said system comprising:

an electric-power-purchase determining apparatus for selecting some of said electric-power suppliers, determining amounts of electric power to be purchased from said selected electric-power suppliers in accordance with a predetermined rule, and ordering electric power of the determined amount from said selected electric-power suppliers to purchase the electric power, wherein said electric-power-purchase determining apparatus determines an electric-power-quality quantitative index showing a quality of electric power received by said customers for each of said customers and determines the amount of electric power to be purchased in a range wherein a quality of electric power individually determined in advance for each of said customers can be sustained as indicated by said electric-power-quality quantitative index;

an electric-power storage apparatus for storing electric power; and a demand control apparatus for transmitting electric power obtained by synthesizing the purchased electric power with electric power generated or absorbed by said electric-power storage apparatus to said customers.

2. An electric power supply control system according to claim 1 further having a measurement apparatus for measuring an operating state and an electric-power consumption of each electric-power consuming facility installed in each of said customers wherein said demand control apparatus compensates for a difference between an electric-power consumption of any of said customers assumed in advance and an actual electric-power consumption, if any, by using said electric-power storage apparatus.

3. An electric power supply control system according to claim 2 wherein said demand control apparatus changes an amount of electric power transmitted to any particular one of said customers by opening and closing an opening/closing device inserted in series between said particular customer and an electric-power distributing facility employed in said electric power supply control system in a case where a measurement result produced by said measurement apparatus indicates that there is a difference between an electric-power consumption of said particular customers assumed in advance and an actual electric-power consumption.

4. An electric power supply control system according to claim 3 wherein said electric-power-purchase determining apparatus determines an electric-power-quality quantitative index showing a quality of electric power received by said customers for each of said customers and determines an amount of electric power to be transmitted individually to each of said customers in a range wherein a quality of electric power individually determined in advance for each of said customers can be sustained as indicated by said electric-power-quality quantitative index.

5. An electric power supply control system according to claim 4 further having a demand forecasting apparatus for forecasting amounts of electric power consumed at the present time and a time in the near future for each of said customers wherein said electric-power-purchase determining apparatus determines an amount of electric power to be purchased at a time in the future on the basis of a demand for electric power predicted by said demand forecasting apparatus.

6. An electric power supply control system according to claim 5 further having a supply-contract-condition data base for storing an electric-power-supply contract made individually with each of said customers and electric-power-purchase-contract-condition data base for storing an electric-power-purchase contract made individually with each of said electric-power suppliers wherein said demand control apparatus controls an electric-power consumption of each of said customers in a range wherein a minimum quality of electric power supplied to each of said customers can be sustained in case a total of amounts of electric power supplied to said customers violates of said electric-power-purchase contract at any time.

7. An electric power supply control system according to claim 6 wherein said demand control apparatus reduces the degree of violation of said electric-power-purchase contract by using said electric-power storage apparatus in case a total of amounts of electric power supplied to said customers violates a condition of said electric-power-purchase contract at any time.

8. An electric power supply control system according to claim 7 wherein said demand control apparatus controls an electric-power consumption of each of said customers in a range wherein a minimum quality of electric power supplied to each of said customers can be sustained in case said violation of said electric-power-purchase contract can not be resolved by using said electric-power storage apparatus.

* * * * *